United States Patent
Schindler et al.

(10) Patent No.: US 7,591,919 B2
(45) Date of Patent: Sep. 22, 2009

(54) FLUID-FILLED CHAMBERS WITH FOAM TENSILE MEMBERS AND METHODS FOR MANUFACTURING THE CHAMBERS

(75) Inventors: Eric S. Schindler, Portland, OR (US); Zvi Rapaport, Portland, OR (US)

(73) Assignee: Nike, Inc., Beaverton, OR (US)

( * ) Notice: Subject to any disclaimer, the term of this patent is extended or adjusted under 35 U.S.C. 154(b) by 31 days.

(21) Appl. No.: 11/837,743

(22) Filed: Aug. 13, 2007

(65) Prior Publication Data

US 2009/0045546 A1  Feb. 19, 2009

(51) Int. Cl.
| | |
|---|---|
| A63B 39/00 | (2006.01) |
| A63B 41/00 | (2006.01) |
| B65C 3/26 | (2006.01) |
| B29C 47/00 | (2006.01) |
| B29C 65/00 | (2006.01) |
| B32B 37/00 | (2006.01) |
| C08J 5/00 | (2006.01) |
| B28B 5/00 | (2006.01) |
| B29C 63/00 | (2006.01) |
| B29C 69/00 | (2006.01) |
| A43B 13/20 | (2006.01) |
| A43B 13/12 | (2006.01) |
| A43B 13/42 | (2006.01) |
| A43B 21/28 | (2006.01) |
| B32B 3/00 | (2006.01) |
| B32B 3/26 | (2006.01) |
| B32B 27/00 | (2006.01) |

(52) U.S. Cl. .................. 156/147; 156/156; 156/224.27; 156/308.4; 156/581; 36/29; 36/30 A; 36/35 B; 428/313.5; 428/319.3; 264/241

(58) Field of Classification Search ...................... 5/706, 5/707, 709, 710, 644, 645, 740; 36/29, 28, 36/30 R, 30 A, 35 B; 156/145, 146, 147, 156/156, 198, 228, 244.13, 244.14, 244.15, 156/245, 306.6, 308.2, 308.4, 581, 583.91, 156/196, 219; 428/304.4, 308.4, 313.3, 313.5; 264/45.1; 441/129, 130, 131, 132

See application file for complete search history.

(56) References Cited

U.S. PATENT DOCUMENTS 3,253,355 A  5/1966  Menken (Continued)

FOREIGN PATENT DOCUMENTS

WO  2006073753 A1  7/2006

OTHER PUBLICATIONS

International Search Report and Written Opinion in PCT Application No. PCT/US2008/066942, mailed Nov. 24, 2008.

*Primary Examiner*—Jeff H Aftergut
*Assistant Examiner*—Brian R Slawski
(74) *Attorney, Agent, or Firm*—Plumsea Law Group, LLC

(57) ABSTRACT

A fluid-filled chamber may include an outer barrier formed from a polymer material and a foam tensile member located within the outer barrier. In manufacturing the fluid-filled chamber, a mold may be contoured to substantially equalize compressive forces between the outer barrier and various portions of the tensile member, thereby providing substantially uniform bonding between the outer barrier and the tensile member. Surfaces of the tensile member may also be contoured to substantially equalize compressive forces. In some configurations, the outer barrier and tensile member may be formed from thermoplastic polymer materials that form a direct bond between the outer barrier and surfaces of tensile member.

29 Claims, 41 Drawing Sheets

U.S. PATENT DOCUMENTS

| | | |
|---|---|---|
| 3,984,926 A | 10/1976 | Calderon |
| 4,025,974 A | 5/1977 | Lea et al. |
| 4,138,156 A | 2/1979 | Bonner |
| 4,219,945 A | 9/1980 | Rudy |
| 4,287,250 A | 9/1981 | Rudy |
| 4,513,449 A | 4/1985 | Donzis |
| 4,619,055 A | 10/1986 | Davidson |
| 4,874,640 A | 10/1989 | Donzis |
| 4,906,502 A | 3/1990 | Rudy |
| 5,083,361 A | 1/1992 | Rudy |
| 5,134,790 A | 8/1992 | Woitschaetzke et al. |
| 5,369,896 A | 12/1994 | Frachey et al. |
| 5,543,194 A | 8/1996 | Rudy |
| 5,572,804 A | 11/1996 | Skaja et al. |
| 5,630,237 A | 5/1997 | Ku |
| 5,741,568 A | 4/1998 | Rudy |
| 5,918,383 A | 7/1999 | Chee |
| 5,976,451 A | 11/1999 | Skaja et al. |
| 5,987,781 A * | 11/1999 | Pavesi et al. .................. 36/29 |
| 5,993,585 A | 11/1999 | Goodwin et al. |
| 5,996,253 A | 12/1999 | Spector |
| 6,029,962 A | 2/2000 | Shorten et al. |
| 6,041,521 A | 3/2000 | Wong |
| 6,098,313 A | 8/2000 | Skaja |
| 6,119,371 A | 9/2000 | Goodwin et al. |
| 6,127,010 A | 10/2000 | Rudy |
| 6,446,289 B1 * | 9/2002 | Su et al. ...................... 5/709 |
| 2003/0098118 A1 * | 5/2003 | Rapaport .................. 156/221 |
| 2005/0039346 A1 | 2/2005 | Thomas et al. |
| 2005/0097777 A1 | 5/2005 | Goodwin |

\* cited by examiner

FLUID-FILLED CHAMBERS WITH FOAM TENSILE MEMBERS AND METHODS FOR MANUFACTURING THE CHAMBERS

BACKGROUND

A conventional article of athletic footwear includes two primary elements, an upper and a sole structure. The upper may be formed from a plurality of material elements (e.g., textiles, leather, and foam materials) that define a void to securely receive and position a foot with respect to the sole structure. The sole structure is secured to a lower surface of the upper and is generally positioned to extend between the foot and the ground. In addition to attenuating ground reaction forces, the sole structure may provide traction and control various foot motions, such as pronation. Accordingly, the upper and the sole structure operate cooperatively to provide a comfortable structure that is suited for a wide variety of ambulatory activities, such as walking and running.

The sole structure of an article of athletic footwear generally exhibits a layered configuration that includes a comfort-enhancing insole, a resilient midsole at least partially formed from a polymer foam, and a ground-contacting outsole that provides both abrasion-resistance and traction. Suitable polymer foam materials for the midsole include ethylvinylacetate or polyurethane that compresses resiliently under an applied load to attenuate ground reaction forces. Conventional polymer foam materials compress resiliently, in part, due to the inclusion of a plurality of open or closed cells that define an inner volume substantially displaced by gas. Following repeated compressions, the cell structure of the polymer foam may deteriorate, thereby resulting in decreased compressibility and decreased force attenuation characteristics of the sole structure.

One manner of reducing the mass of a polymer foam midsole and decreasing the effects of deterioration following repeated compressions is to incorporate a fluid-filled chamber into the midsole. In general, the fluid-filled chambers are formed from a polymer material that is sealed and pressurized. The chambers are then encapsulated in the polymer foam of the midsole such that the combination of the chamber and the encapsulating polymer foam functions as the midsole. In some configurations, textile or foam tensile members may be located within the chamber or reinforcing structures may be bonded to an exterior of the chamber to impart shape to the chamber.

Fluid-filled chambers suitable for footwear applications may be manufactured by a two-film technique, in which two separate polymer sheets, which may be an elastomeric film, are formed to exhibit the overall peripheral shape of the chamber. The polymer sheets are then bonded together along their respective peripheries to form a sealed structure, and the polymer sheets are also bonded together at predetermined interior areas to give the chamber a desired configuration. That is, interior bonds (i.e., bonds spaced inward from the periphery) provide the chamber with a predetermined shape and size upon pressurization. In order to pressurize the chamber, a nozzle or needle connected to a fluid pressure source is inserted into a fill inlet formed in the chamber. Following pressurization of the chamber, the fill inlet is sealed and the nozzle is removed. A similar procedure, referred to as thermoforming, may also be utilized, in which a mold forms or otherwise shapes heated polymer sheets during the manufacturing process. In some configurations, the thermoforming process also involves bonding a tensile member between the polymer sheets while forming or shaping the polymer sheets. The tensile member then restrains outward movement of opposite sides of the chamber when inflated with a pressurized fluid.

Chambers may also be manufactured by a blow-molding technique, wherein a molten or otherwise softened elastomeric material in the shape of a tube is placed in a mold having the desired overall shape and configuration of the chamber. The mold has an opening at one location through which pressurized air is provided. The pressurized air induces the liquefied elastomeric material to conform to the shape of the inner surfaces of the mold. The elastomeric material then cools, thereby forming a chamber with the desired shape and configuration. As with the two-film technique, a nozzle or needle connected to a fluid pressure source is inserted into a fill inlet formed in the chamber in order to pressurize the chamber. Following pressurization of the chamber, the fill inlet is sealed and the nozzle is removed.

SUMMARY

A method of manufacturing a fluid-filled chamber may include placing a tensile member between a first layer and a second layer of polymer material. The tensile member has a first portion with greater compressibility than a second portion. In addition, the tensile member, the first layer, and the second layer are located within a mold having a protrusion in an area that contacts the first layer adjacent to the first portion of the tensile member. The method also includes compressing the tensile member, the first layer of the polymer material, and the second layer of the polymer material within the mold to (a) bond the first layer to a first surface of the tensile member, (b) bond the second layer to a second surface of the tensile member, and (c) bond the first layer and the second layer together around a periphery of the tensile member.

The tensile member may be formed to include a cavity in the first portion of the tensile member. In some configurations, the tensile member may be formed to include channels extending through the tensile member and located in the first portion of the tensile member. In other configurations, the tensile member may be formed from foam materials of different density, with the lower density form material being in the first portion of the tensile member. The tensile member and layers may also be formed from thermoplastic materials that are directly bonded to each other. Among other uses, the chamber may be incorporated into an article of footwear.

Another aspect relates to a method of manufacturing a fluid-filled chamber with a tensile member that has a protrusion. The tensile member has a first portion with greater compressibility than a second portion, and a surface of the tensile member with the protrusion is in the first portion. The tensile member, the first layer, and the second layer are located a mold that compresses the layers into the protrusion prior to compressing the layers into the second portion of the tensile member.

The advantages and features of novelty characterizing aspects of the invention are pointed out with particularity in the appended claims. To gain an improved understanding of the advantages and features of novelty, however, reference may be made to the following descriptive matter and accompanying drawings that describe and illustrate various embodiments and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose various fluid-filled chambers and methods for manufacturing the chambers. Although the chambers are discussed as being utilized in articles of footwear, the chambers may also be incorporated into a variety of other products, including straps for carrying backpacks and golf bags, cushioning pads or helmets for football or hockey, or bicycle seats, for example. In addition, the chambers may be incorporated into various non-athletic products, such as inflatable mattresses and seat cushions, for example. Accordingly, the various fluid-filled chambers disclosed below with respect to footwear may be utilized in connection with a variety of products.

Figure 1:
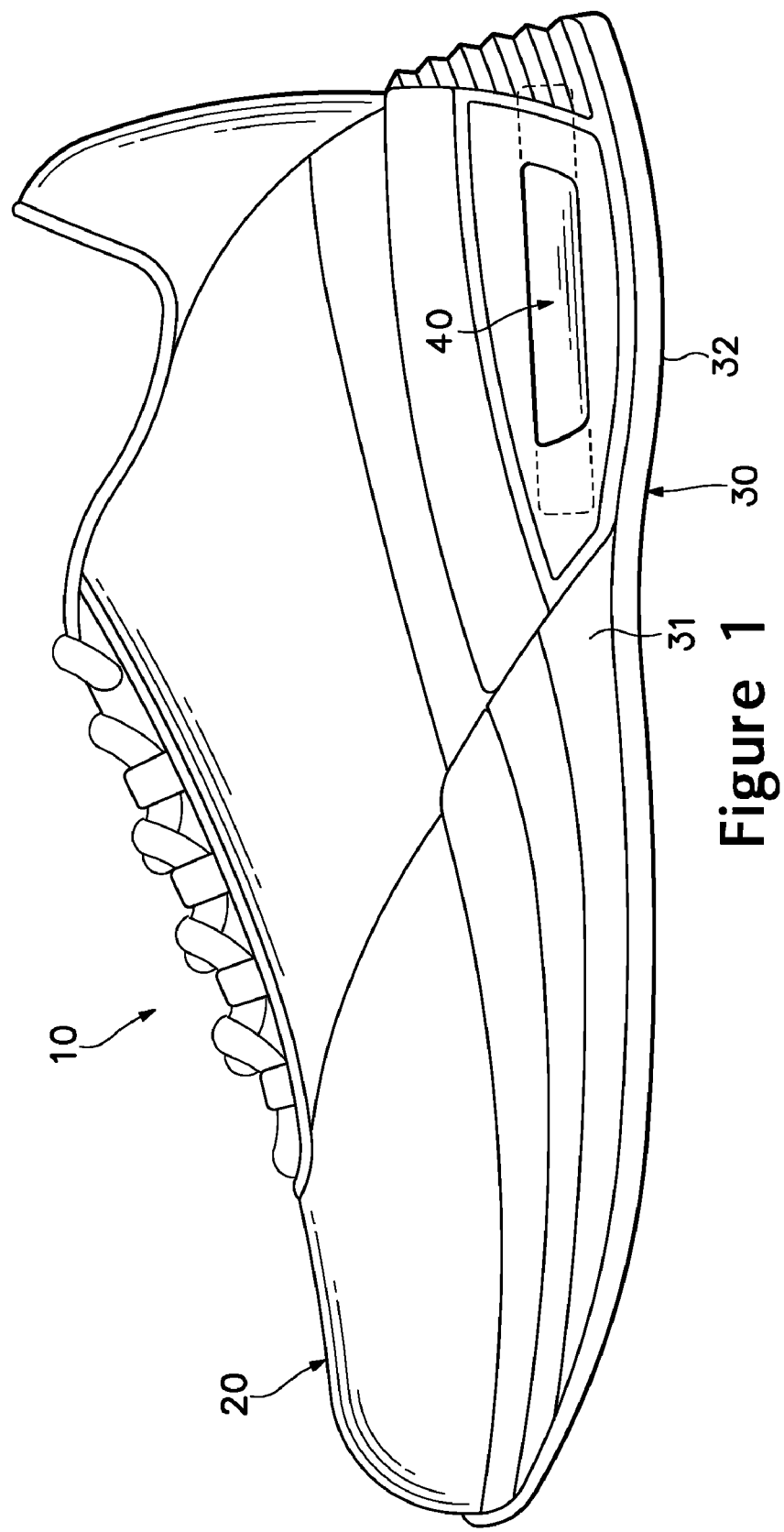
FIG. 1 is a side elevational view of an article of footwear incorporating a first chamber.
Figure 2:
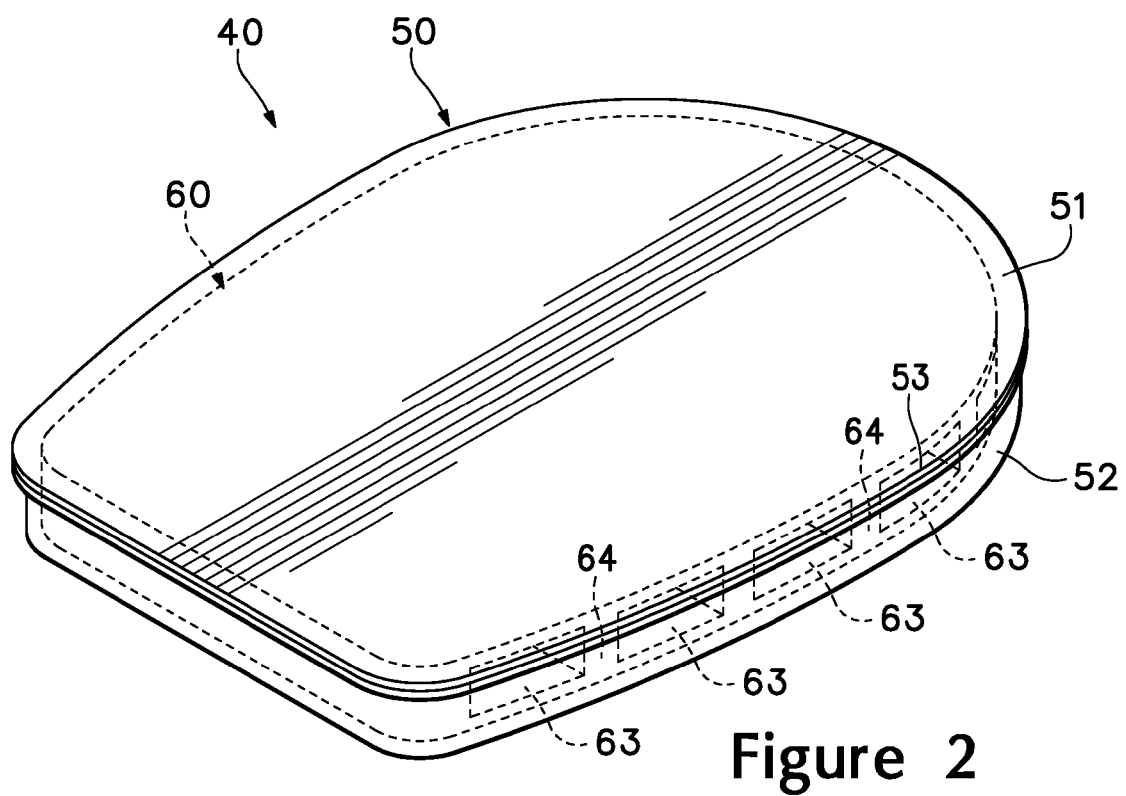
FIG. 2 is a perspective view of the first chamber.
Figure 3:
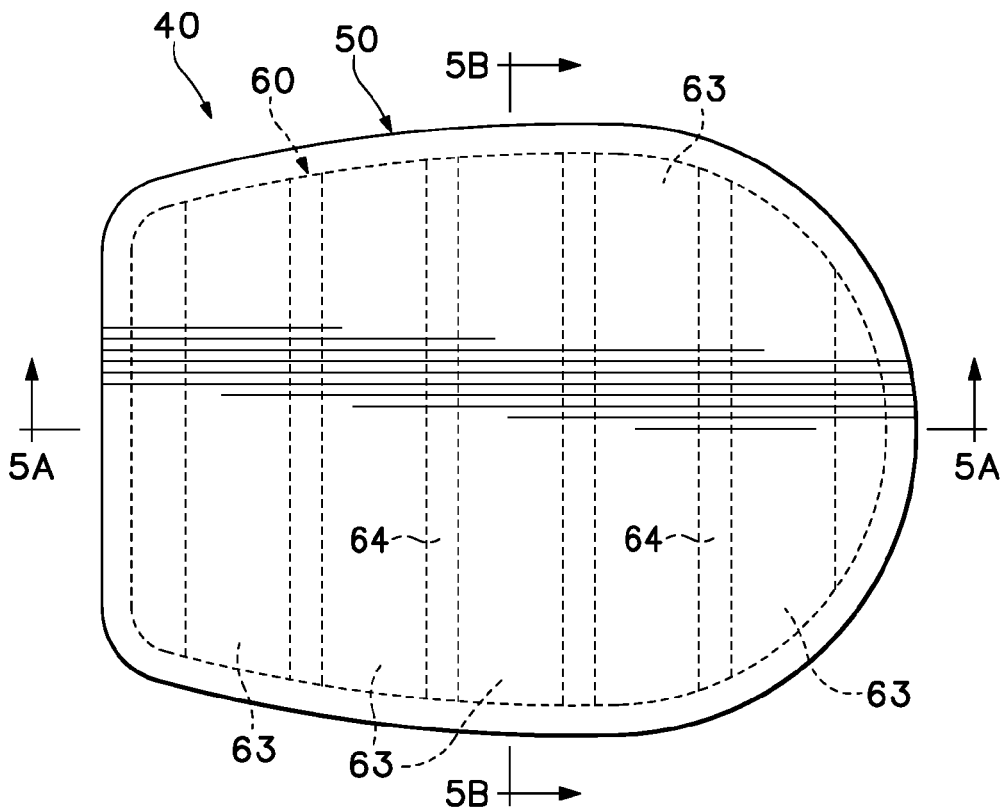
FIG. 3 is a top plan view of the first chamber.
Figure 4:
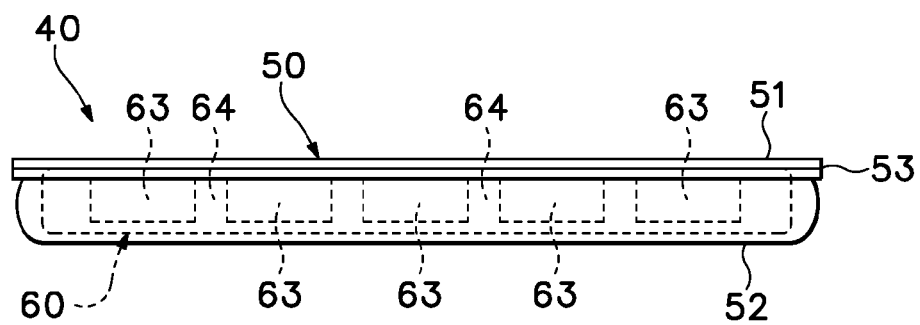
FIG. 4 is a side elevational view of the first chamber.
Figure 5A:
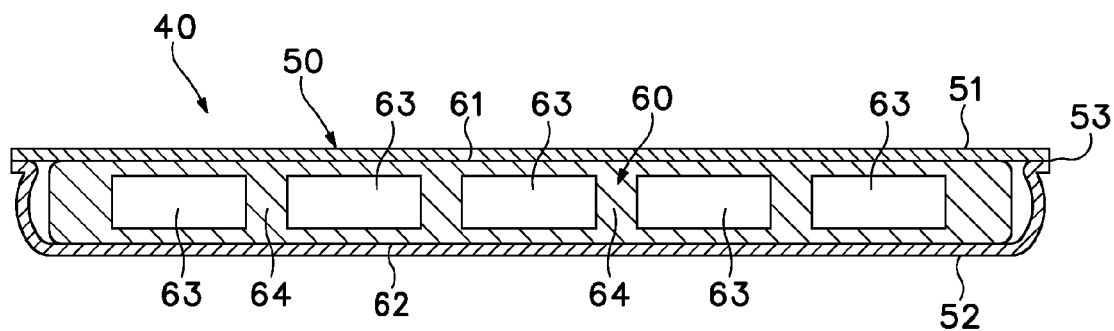
FIGS. 5A and 5B are cross-sectional views of the first chamber, as defined by section lines 5A and 5B in FIG. 3.
Figure 5B:
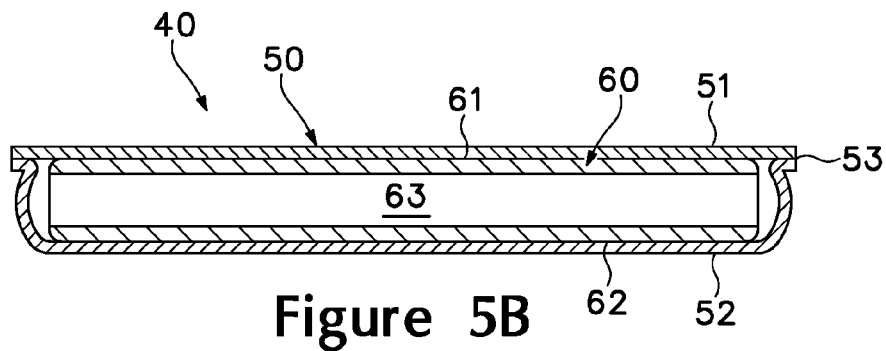

An article of footwear 10 is depicted in FIG. 1 as including an upper 20 and a sole structure 30. Upper 20 has a substantially conventional configuration and includes a plurality elements, such as textiles, foam, and leather materials, that are stitched or adhesively bonded together to form an interior void for securely and comfortably receiving a foot. Sole structure 30 is positioned below upper 20 and includes two primary elements, a midsole 31 and an outsole 32. Midsole 31 is secured to a lower surface of upper 20 (e.g., through stitching or adhesive bonding) and operates to attenuate ground reaction forces as sole structure 30 is compressed between the foot and the ground. That is, midsole 31 is structured to provide the foot with cushioning during walking, running, or other ambulatory activities. Outsole 32 is secured to a lower surface of midsole 31 and is formed of a durable, wear-resistant material that is suitable for engaging the ground. In addition, sole structure 30 may include an insole or sockliner (not depicted), which is a thin cushioning member, located within the void in upper 20 and adjacent to a plantar (i.e., lower) surface of the foot to enhance the comfort of footwear 10.

Midsole 31 is primarily formed of a polymer foam material, such as polyurethane or ethylvinylacetate, that encapsulates a fluid-filled chamber 40. Although chamber 40 is depicted in FIG. 1 as being positioned in a heel region of midsole 31, chamber 40 may be positioned in any region of midsole 31 to impart additional cushioning. Furthermore, midsole 31 may encapsulate multiple fluid-filled chambers having the general configuration of chamber 40 or other types of chambers. Chamber 40 may be only partially encapsulated within midsole 31 or entirely encapsulated within midsole 31. For example, portions of chamber 40 may protrude outward from a side surface of midsole 31, or an upper surface of chamber 40 may coincide with an upper surface of midsole 31. Alternately, midsole 31 may extend over and entirely around chamber 40, thereby fully encapsulating chamber 40. In addition, and as depicted in FIG. 1, chamber 40 may be visible through an aperture or opening in midsole 31. Although chamber 40 has a configuration that is suitable for use with sole structure 30, similar chambers may be incorporated into upper 20. Accordingly, the position of chamber 40 with respect to footwear 10 and the manner in which chamber 40 is incorporated into footwear 10 may vary significantly.

First Chamber Configuration

The primary elements of chamber 40, as depicted in FIGS. 2-5B, are an outer barrier 50 and a tensile member 60. Barrier 50 includes a first barrier layer 51 and a second barrier layer 52 that are substantially impermeable to a pressurized fluid contained by chamber 40. The pressurized fluid will, therefore, generally remain sealed within chamber 40 for a duration that includes the expected life of footwear 10, or fluid may diffuse into chamber 40 to sustain the pressure for the expected life of footwear 10. First barrier layer 51 and second barrier layer 52 are bonded together around their respective peripheries to form a peripheral bond 53 and cooperatively form a sealed enclosure, in which tensile member 60 and the pressurized fluid are located.

Figure 6:
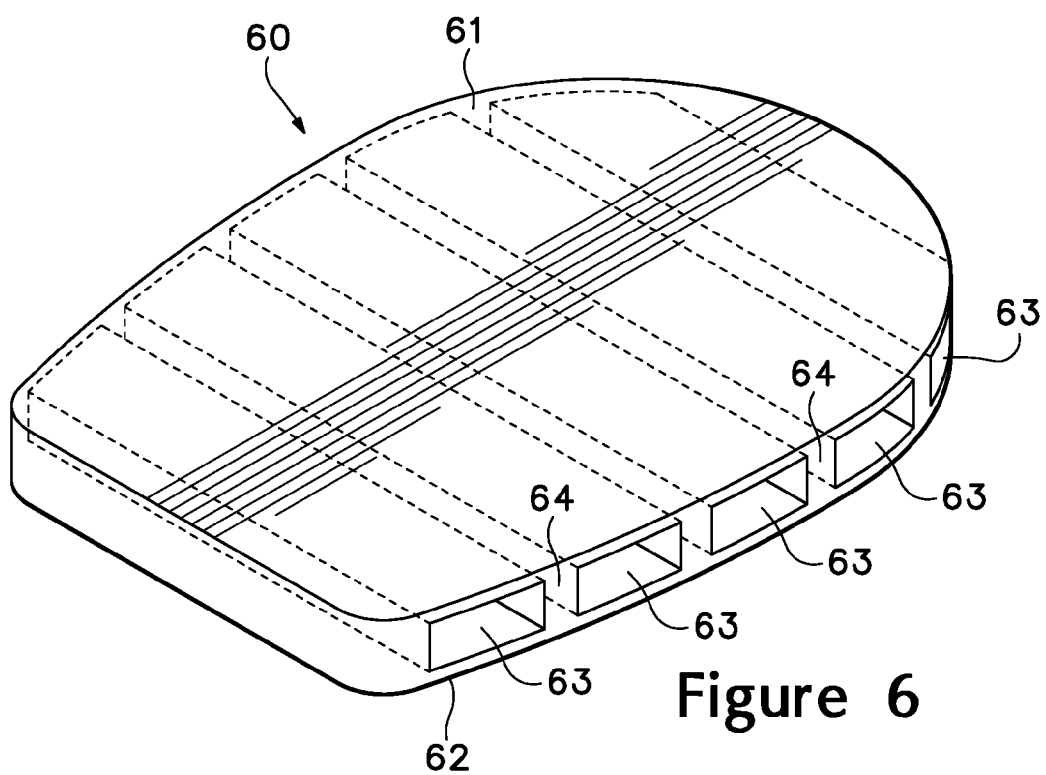
FIG. 6 is a perspective view of a tensile member of the first chamber.

Tensile member 60, which may be formed from a polymer foam material, is located within barrier 50 and bonded to barrier 50. As depicted in FIG. 6, tensile member 60 includes a first surface 61 and an opposite second surface 62 that are generally planar and parallel to each other. Whereas first surface 61 is bonded to first barrier layer 51, second surface 62 is bonded to second barrier layer 52. Tensile member 60 also defines five cavities 63 that extend entirely through the foam material of tensile member 60 and in a direction that is parallel to each of surfaces 61 and 62, thereby forming channels extending through tensile member 60. Cavities 63 define four columns 64 of the foam material that separate cavities 63 and extend between surfaces 61 and 62. In further configurations of chamber 40, cavities 63 may only extend partially through tensile member 60 or may extend in different directions. In addition, the density or compressibility of the foam material forming various portions of tensile member 60 may vary. For example, the portion of tensile member 60 located in a lateral area of footwear 10 may exhibit a different density than the portion of tensile member 60 located in a medial area of footwear 10. A variety of conventional molding techniques may be utilized to form tensile member 60.

The pressurized fluid contained by chamber 40 induces an outward force upon barrier 50 and tends to separate or otherwise press outward upon first barrier layer 51 and second barrier layer 52. In the absence of tensile member 60, the outward force induced by the pressurized fluid would impart a rounded or otherwise bulging configuration to chamber 40. Tensile member 60, however, is bonded to each of first barrier layer 51 and second barrier layer 52 to restrain the separation of barrier layers 51 and 52. More particularly, the fluid places an outward force upon the interior of cavities 63, for example, and columns 64 restrain deformation of chamber 40 as a result of the outward force. Accordingly, portions of tensile member 60 are placed in tension by the fluid, and tensile member 60 retains the generally flat configuration of chamber 40 that is depicted in the figures.

As discussed above, tensile member 60 is bonded to each of first barrier layer 51 and second barrier layer 52. A variety of bonding methods may be employed to secure barrier 50 and tensile member 60 together, and the bonding methods may be at least partially determined by the materials selected for each of barrier 50 and tensile member 60. For example, an adhesive may be utilized to bond barrier 50 and tensile member 60. When at least one of barrier 50 and tensile member 60 are formed from a thermoplastic polymer material, however, direct bonding may be an effective manner of securing barrier 50 and tensile member 60. As utilized within the present application, the term "direct bond" or variants thereof is defined as a securing technique between barrier 50 and tensile member 60 that involves a melting or softening of at least one of barrier 50 and tensile member 60 such that the materials of barrier 50 and tensile member 60 are secured to each other when cooled. In general, the direct bond may involve the melting or softening of both barrier 50 and tensile member 60 such that the materials diffuse across a boundary layer between barrier 50 and tensile member 60 and are secured together when cooled. The direct bond may also involve the melting or softening of only one of barrier 50 and tensile member 60 such that the molten material extends into crevices or cavities formed by the other material to thereby secure the components together when cooled. Accordingly, a direct bond between barrier 50 and tensile member 60 does not generally involve the use of adhesives. Rather, barrier 50 and tensile member 60 are directly bonded to each other.

Examples of polymer materials that may be suitable for barrier 50 include thermoplastic urethane, polyurethane, polyester, polyester polyurethane, and polyether polyurethane. In addition, barrier 50 may be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for compression member 50 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

Both thermoplastic and thermoset polymer materials may be utilized for barrier 50. An advantage of utilizing a thermoplastic polymer material over a thermoset polymer material for barrier 50 is that first barrier layer 51 and second barrier layer 52 may be bonded together through the application of heat at the position of peripheral bond 53. In addition, first barrier layer 51 and second barrier layer 52 may be heated and stretched to conform to the desired shape of barrier 50. Whereas first barrier layer 51 forms the upper surface of chamber 40, second barrier layer 52 forms both the lower surface and a majority of a sidewall of chamber 40. This configuration positions peripheral bond 53 adjacent to the upper surface and promotes visibility through the sidewall. Alternately, peripheral bond 53 may be positioned adjacent to the lower surface or at a location that is between the upper surface and the lower surface. Peripheral bond 53 may, therefore, extend through the sidewall such that both first barrier layer 51 and second barrier layer 52 form substantially equal portions of the sidewall. Accordingly, the specific configuration of barrier 50 and the position of peripheral bond 53 may vary significantly within the scope of the present invention.

A variety of foam materials are suitable for tensile member 60. Thermoset polymer foams, including polyurethane and ethylvinylacetate, may be utilized with an adhesive or when the direct bond involves the melting or softening of barrier 50 such that the molten material extends into cavities formed by the foamed cells of tensile member 60. When both barrier 50 and tensile member 60 are formed of a thermoplastic polymer foam, the materials forming both components may be melted or softened such that the materials diffuse across a boundary layer between barrier 50 and tensile member 60 and are secured together upon cooling. Direct bonding may, therefore, occur between barrier 50 and tensile member 60 whether tensile member 60 is formed from a thermoset or thermoplastic polymer foam. Thermoplastic polymer foams also exhibit an advantage of having greater tear and shear properties than thermoset polymer foams, and thermoplastic polymer foams are reusable or recyclable.

With regard to thermoplastic polymer foams, one suitable material is manufactured by Huntsman International, L.L.C. under the SMARTLITE trademark. A suitable version of this thermoplastic polyurethane foam exhibits a density of 0.65 grams per cubic centimeter and a hardness of 57 on the Shore A scale. In further embodiments of the invention, a thermoplastic polyurethane foam exhibiting a density of 0.50 grams per cubic centimeter and a hardness of 85 on the Shore A scale may be utilized. Accordingly, the density and hardness of suitable polymer foams may vary significantly within the scope of the present invention. Another suitable material is produced through a process developed by Trexel, Incorporated and marketed under the MUCELL trademark. The process involves injecting a supercritical fluid, such as carbondioxide or nitrogen, into a thermoplastic polyurethane. A large number of nucleation sites are then formed in the thermoplastic polyurethane through a substantial and rapid pressure drop. The controlled growth of cells is achieved through monitoring of the pressure and temperature following the pressure drop, and the thermoplastic polyurethane is injected into a mold to form tensile member 60.

The fluid contained by chamber 40 may be any of the gasses disclosed in U.S. Pat. No. 4,340,626 to Rudy, hereby incorporated by reference, such as hexafluoroethane and sulfur hexafluoride, for example. In addition, the fluid may include pressurized octafluorapropane, nitrogen, and air. The pressure of the fluid may range from a gauge pressure of zero to fifty pounds per square inch or more, for example.

With reference to FIG. 1, chamber 40 is at least partially encapsulated by the polymer foam material of midsole 31. During walking, running, or other ambulatory activities, midsole 31 and chamber 40 are compressed between the heel of the foot and the ground, thereby attenuating ground reaction forces. As discussed above, tensile member 60 is bonded to each of first barrier layer 51 and second barrier layer 52 and is placed in tension by the pressurized fluid. As chamber 40 is compressed between the foot and the ground, therefore, chamber 40 is compressed and the tension in tensile member 60 is relieved. Upon removal of the compressive force caused by the foot and the ground, the outward force induced by the fluid returns the tension in tensile member 60. The compression of chamber 40 provides a portion, therefore, of the ground reaction force attenuation of sole structure 30.

Manufacturing Process For First Chamber

Figure 7:
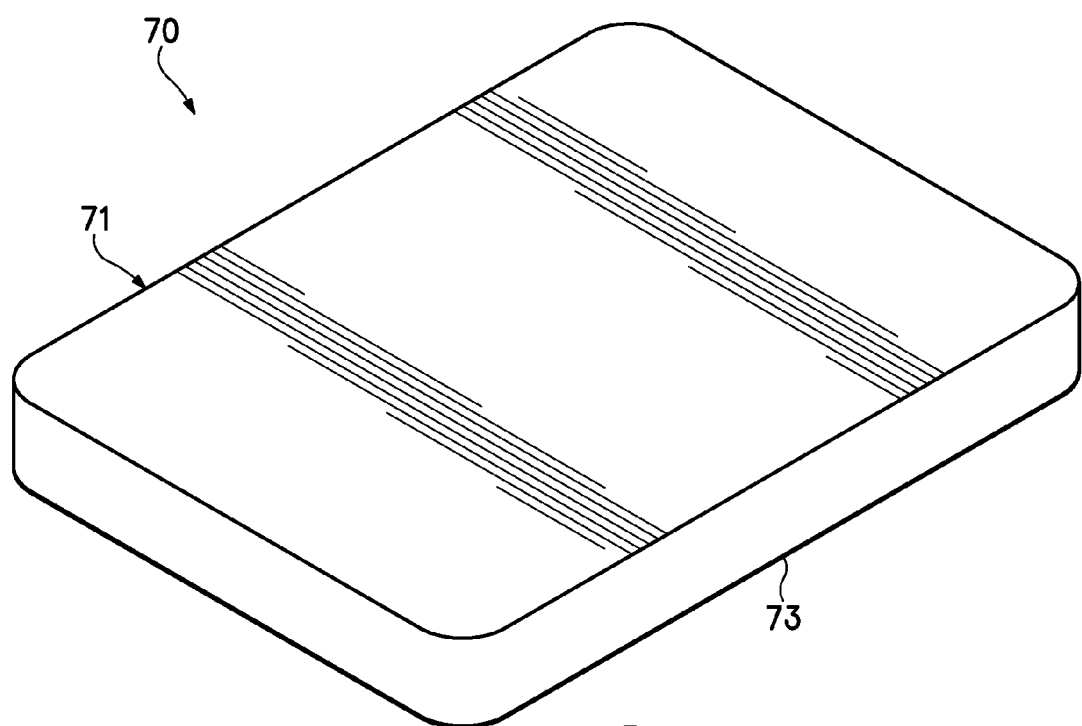
FIG. 7 is a perspective view of a mold for manufacturing the first chamber.
Figure 7:
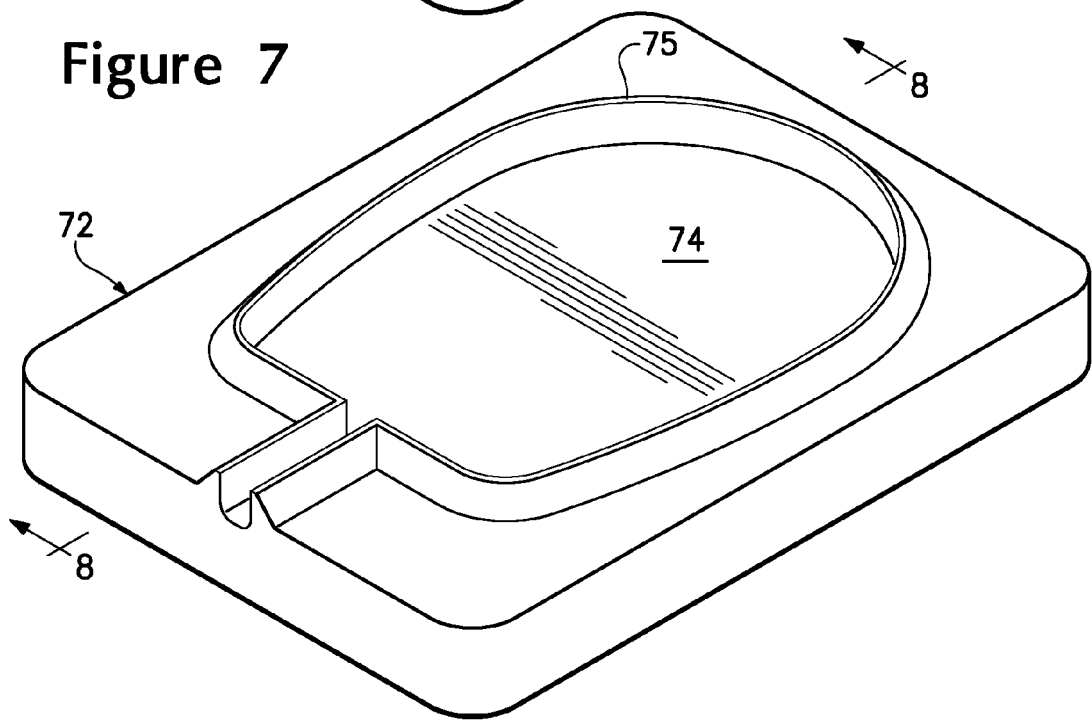

Although a variety of manufacturing processes may be utilized to form chamber 40, an example of a suitable thermoforming process will now be discussed. With reference to FIG. 7, a mold 70 that may be utilized in the thermoforming process is depicted as including a first mold portion 71 and a second mold portion 72. Mold 70 is utilized to form chamber 40 from a pair of polymer sheets (i.e., first barrier layer 51 and second barrier layer 52) and tensile member 60. More particularly, mold 70 facilitates the thermoforming process by (a) imparting shape to first barrier layer 51 and second barrier layer 52, (b) joining a periphery of first barrier layer 51 and second barrier layer 52 to form peripheral bond 53, and (c) bonding tensile member 60 to first barrier layer 51 and second barrier layer 52.

In manufacturing chamber 40, one or more of first barrier layer 51, second barrier layer 52, and tensile member 60 are heated to a temperature that facilitates bonding between the components. Depending upon the specific materials utilized for first barrier layer 51, second barrier layer 52, and tensile member 60, suitable temperatures may range from 120 to 200 degrees Celsius (248 to 392 degrees Fahrenheit). As an example, a material having alternating layers of thermoplastic polyurethane and ethylene-vinyl alcohol copolymer may be heated to a temperature in a range of 149 to 188 degrees Celsius (300 and 370 degrees Fahrenheit) to facilitate bonding. Various radiant heaters or other devices may be utilized to heat the components of chamber 40. In some manufacturing processes, mold 70 may be heated such that contact between mold 70 and the components of chamber 40 raises the temperature of the components to a level that facilitates bonding.

Figure 8A:
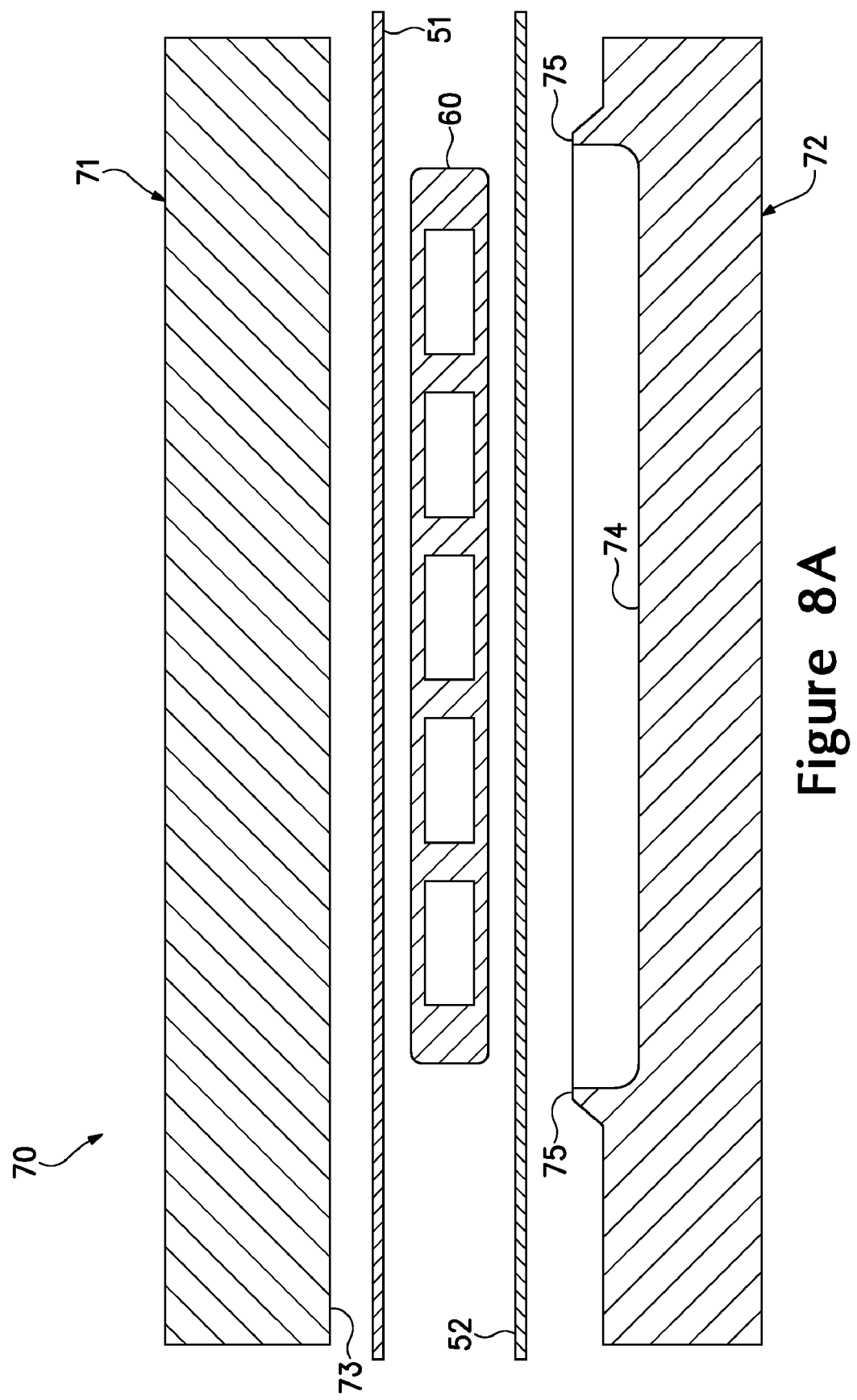
FIGS. 8A-8C are schematic cross-sectional views of the mold, as defined by section line 8 in FIG. 7, depicting steps in a manufacturing process for the first chamber.
Figure 8B:
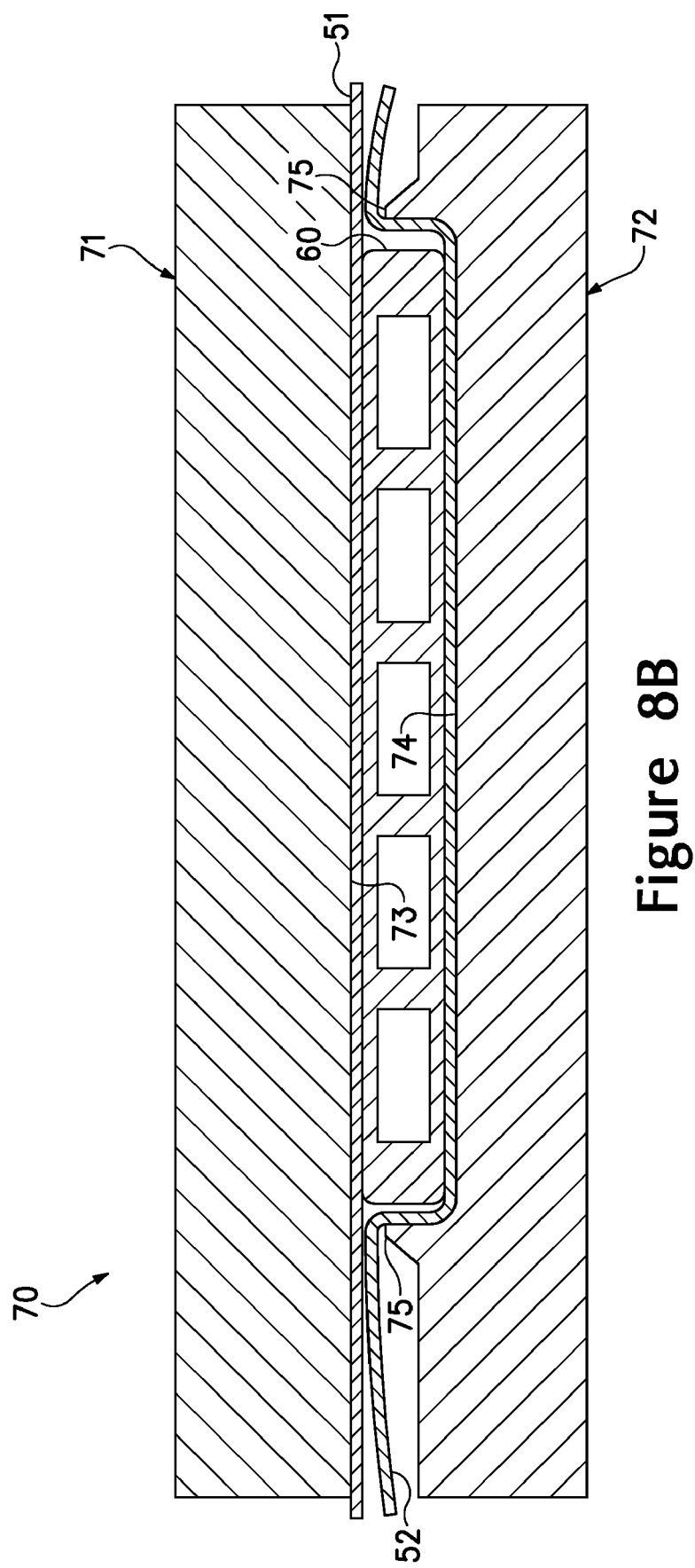

Following heating, the components of chamber 40 are located between mold portions 71 and 72, as depicted in FIG. 8A. In order to properly position the components, a shuttle frame or other device may be utilized. Once positioned, mold portions 71 and 72 translate toward each other and begin to close upon the components such that (a) a planar surface 73 of first mold portion 71 contacts first barrier layer 51 and (b) a depressed surface 74 of second mold portion 72 contacts second barrier layer 52 in the area of tensile member 60, thereby compressing the components between mold portions 71 and 72, as depicted in FIG. 8B. The compressive force of planar surface 73 and depressed surface 74, coupled with the elevated temperature of the compressed components, begins to bond tensile member 60 to each of barrier layers 51 and 52.

Following or during the bonding of tensile member 60 to barrier layers 51 and 52, air may be partially evacuated from the area between planar surface 73 and depressed surface 74 through various vacuum ports in mold portions 71 and 72. The purpose of evacuating the air is to draw barrier layers 51 and 52 into contact with the various portions of mold 70. This ensures that barrier layers 51 and 52 are properly shaped in accordance with the contours of mold 70. Furthermore, drawing barrier layer 52 into depressed surface 74 is primarily responsible for shaping the sidewall of bladder 40 and ensuring that the sidewall of bladder 40 has sufficient height to locate peripheral bond 53 on the plane of first barrier layer 51. Note that second barrier layer 52 may stretch in order to extend into depressed surface 74 and form the sidewall of bladder 40. Differences between the original thicknesses of layers 51 and 52 may compensate for thinning in second barrier layer 52 that occurs when second barrier layer 52 is stretched and drawn into depressed surface 74. That is, second barrier layer 52 may initially have a greater thickness than first barrier layer 51, but following stretching both barrier layers 51 and 52 may exhibit substantially similar or uniform thicknesses.

In order to provide a second means for drawing barrier layers 51 and 52 into contact with the various portions of mold 70, the area between barrier layers 51 and 52 and proximal tensile member 60 may be pressurized. During a preparatory stage of this method, an injection needle may be located between barrier layers 51 and 52, and the injection needle may be located such that a ridge 75 in mold portion 72 envelops the injection needle when mold 70 closes. A gas may then be ejected from the injection needle such that barrier layers 51 and 52 engage the surfaces of ridge 75, thereby forming an inflation conduit 41 between layers 51 and 52. The gas may then pass through inflation conduit 41, thereby entering and pressurizing the area proximal to tensile member 60. In combination with the vacuum, the internal pressure ensures that barrier layers 51 and 52 contact the various portions of mold 70.

Figure 8C:
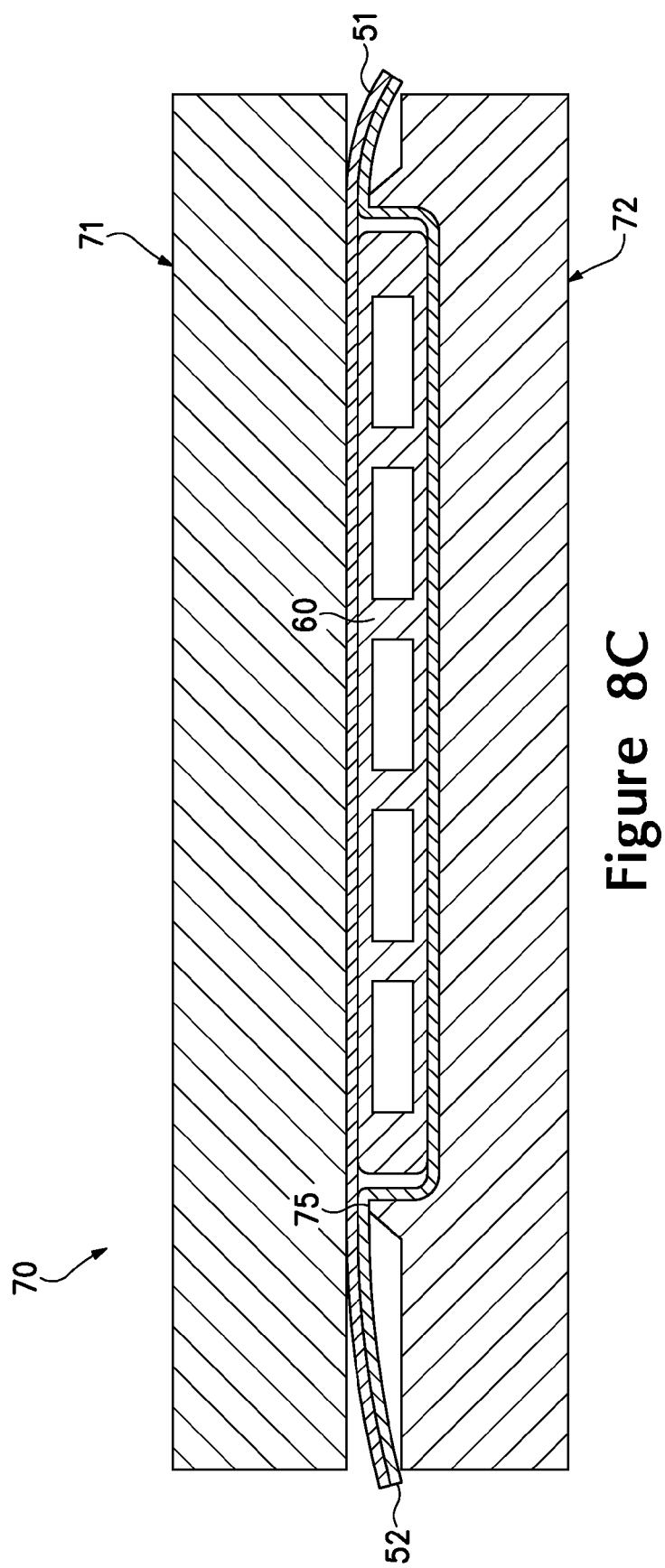

As mold 70 closes further, the portion of ridge 75 extending around depressed surface 74 bonds first barrier layer 51 to second barrier layer 52, as depicted in FIG. 8C, thereby forming peripheral bond 53. That is, ridge 75 compresses portions of barrier layers 51 and 52 together to form peripheral bond 53 as mold portions 71 and 72 continue to translate toward each other. Furthermore, portions of ridge 75 that extends away from depressed surface 74 forms a bond between other areas of layers 51 and 52 to form inflation conduit 41, as depicted in FIG. 9.

Figure 9:
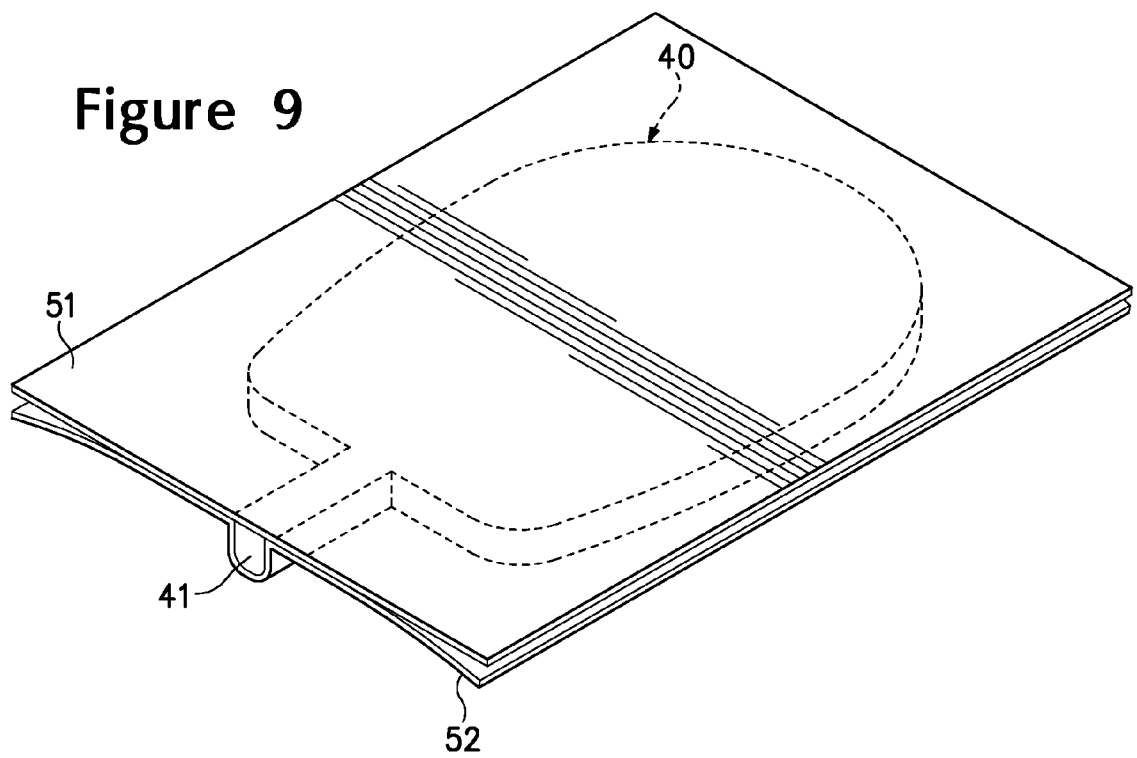
FIG. 9 is a perspective view of the first chamber during the manufacturing process.

When bonding is complete, mold 70 is opened and chamber 40 and excess portions of barrier layers 51 and 52 are removed and permitted to cool, as depicted in FIG. 9. A fluid may be injected into chamber 40 through the inflation needle and inflation conduit 41, which is formed by ridge 75. In addition, a sealing process is utilized to seal inflation conduit 41 adjacent to each chamber 40 after pressurization. The excess portions of first barrier layer 51 and second barrier layer 52 are then removed, thereby completing the manufacture of bladder 40. As an alternative, the order of inflation and removal of excess material may be reversed. As a final step in the process, bladder 40 may be incorporated into midsole 31 of footwear 10.

Alternate Manufacturing Process For First Chamber

As discussed above, tensile member 60 defines five cavities 63 that extend entirely through the foam material, and cavities 63 define four columns 64 that separate cavities 63 and extend between surfaces 61 and 62. Cavities 63 and columns 64 effectively form areas of tensile member 60 that compress to different degrees. More particularly, a compressive force exerted upon a portion of tensile member 60 corresponding with a location of one of cavities 63 will cause a greater deflection than a compressive force exerted upon a portion of tensile member 60 corresponding with a location of one of columns 64. Accordingly, areas corresponding with cavities 63 deflect more easily than areas corresponding with columns 64.

In the manufacturing process discussed above, the components of chamber 40 are compressed between mold portions 71 and 72. More particularly, barrier layers 51 and 52 are bonded to tensile member 60 through the application of pressure from planar surface 73 and depressed surface 74. Given that areas of tensile member 60 deflect differently upon the application of a compressive force, however, the degree to which barrier layers 51 and 52 are compressed into the material of tensile member 60 may vary. That is, tensile member 60 and barrier layers 51 and 52 may be compressed more in the areas of columns 64 than in the areas of cavities 63 because of differences in deflection in these areas. Accordingly, the degree to which barrier layers 51 and 52 are bonded to tensile member 60 may vary across tensile member 60.

Although the manufacturing process discussed above provides a suitable method for forming chamber 40, the differences in the degree to which barrier layers 51 and 52 are bonded to tensile member 60 may affect chamber 40. For example, the differences in bonding may cause barrier layers 51 and 52 to be less durable in the areas of cavities 63 after repeated compressions within footwear 10. That is, the bonds between tensile member 60 and barrier layers 51 and 52 may be stronger in the areas of columns 64 than in the areas of cavities 63 because of the reduced compression in the areas of cavities 63. As discussed in detail below, modifications to mold 70 may be utilized to equalize the compression across tensile member 60, thereby equalizing the bonding and enhancing the durability of chamber 40.

Figure 10:
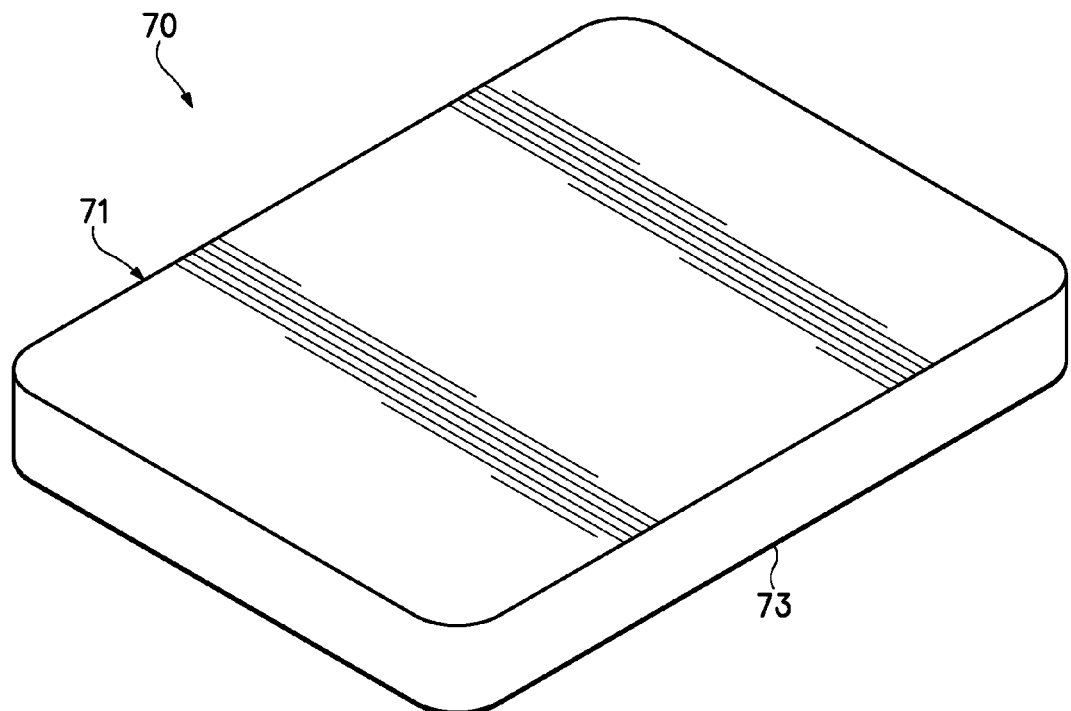
FIG. 10 is a perspective view of an alternate configuration of the mold.
Figure 10:
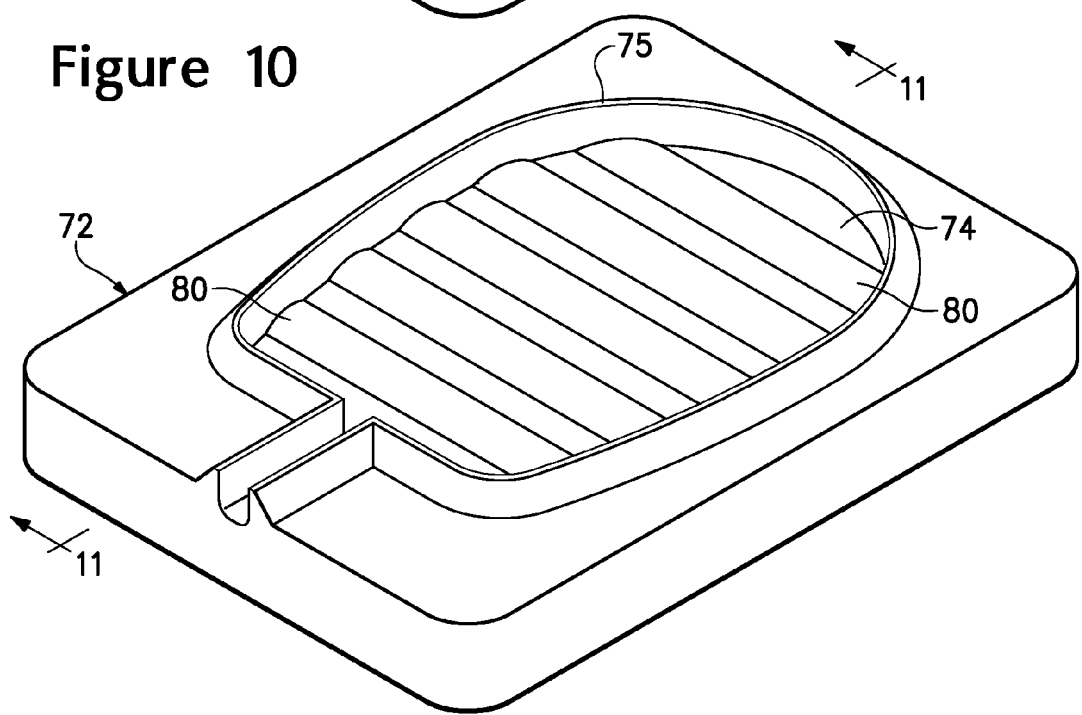
Figure 11A:
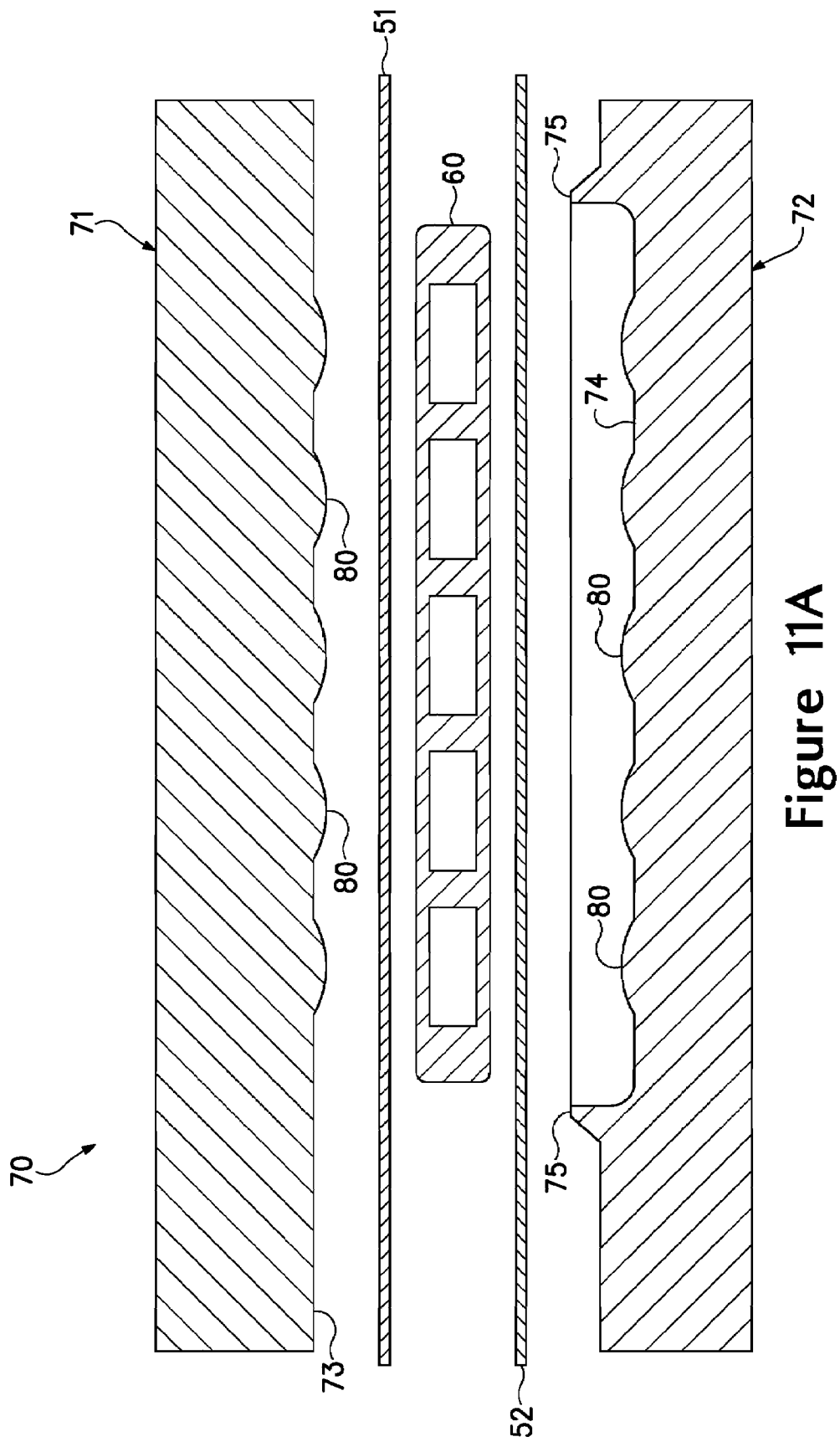
FIGS. 11A-11C are schematic cross-sectional views of the alternate configuration of the mold, as defined by section line 11 in FIG. 10, depicting steps in an alternate manufacturing process for the first chamber.
Figure 11B:
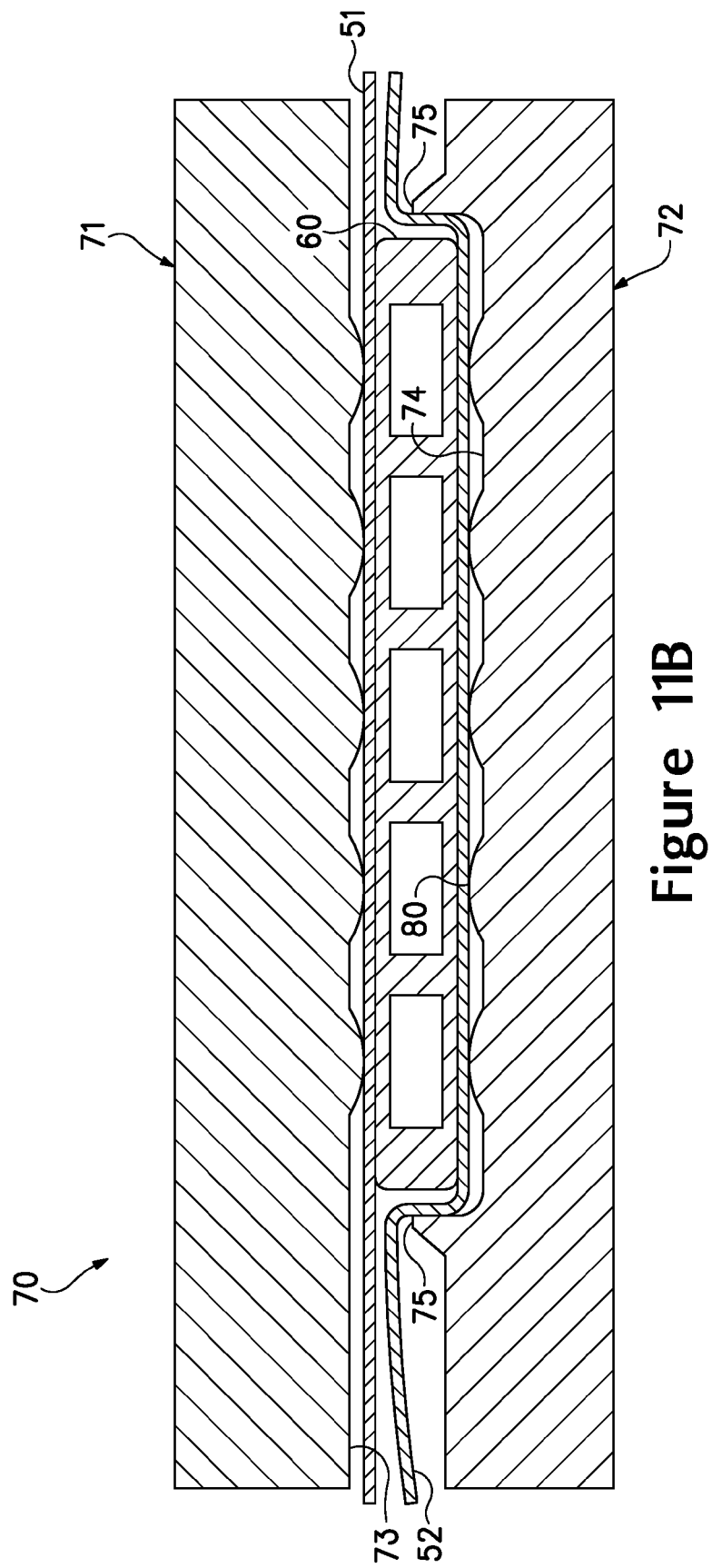
Figure 11C:
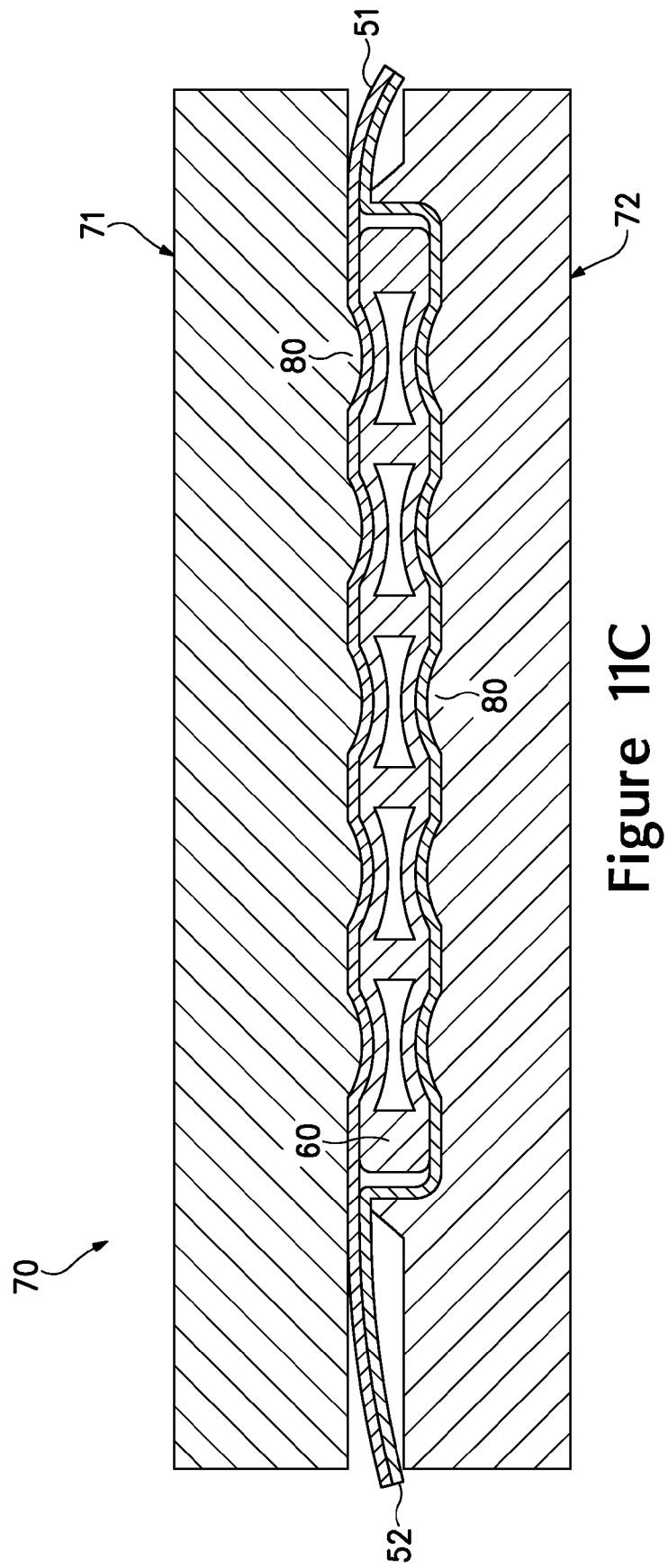
Figure 12:
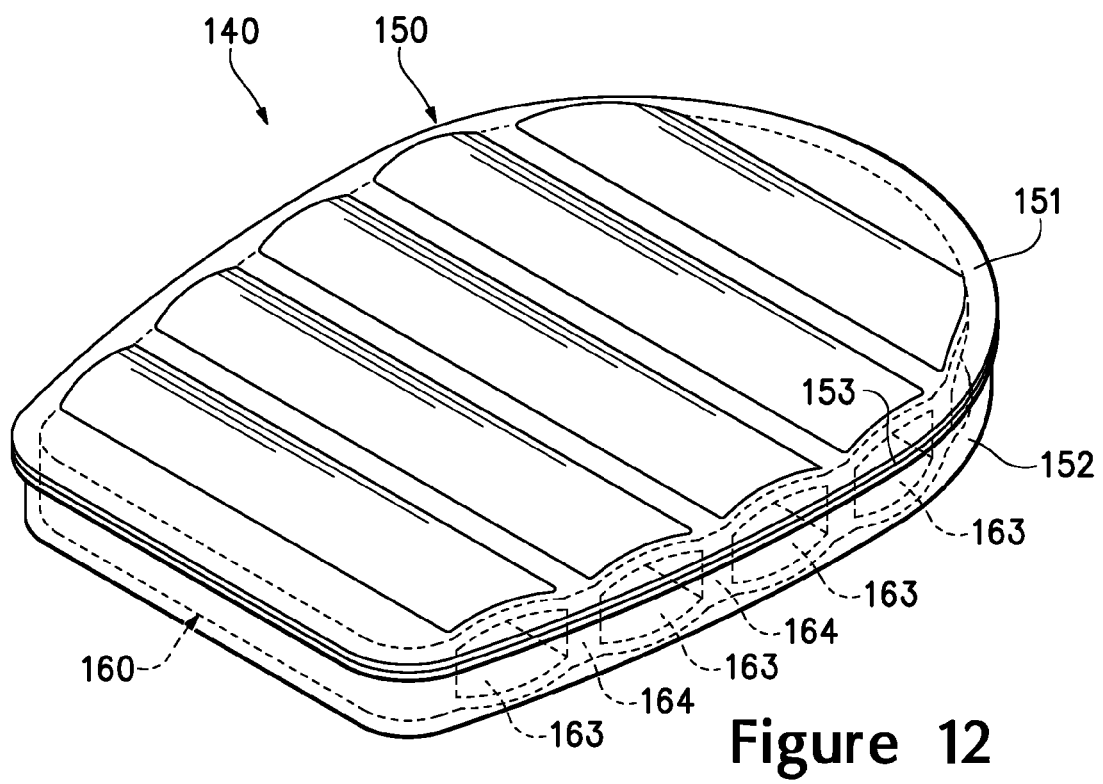
FIG. 12 is a perspective view of a second chamber.
Figure 13:
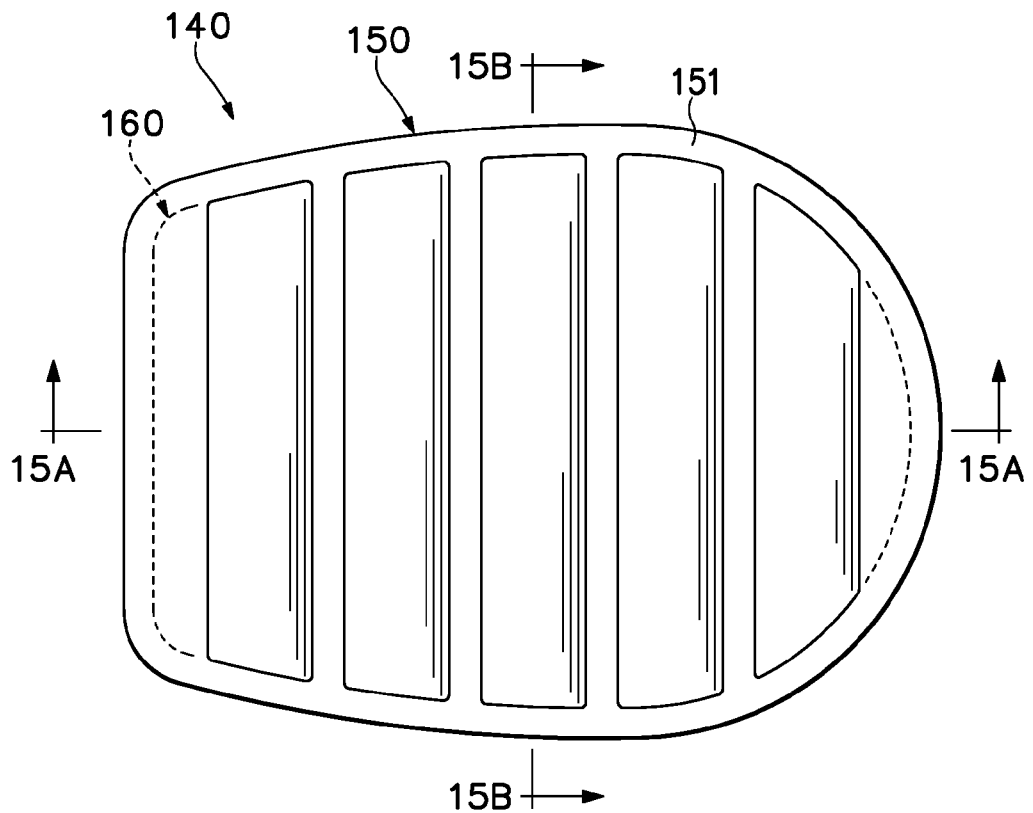
FIG. 13 is a top plan view of the second chamber.
Figure 14:
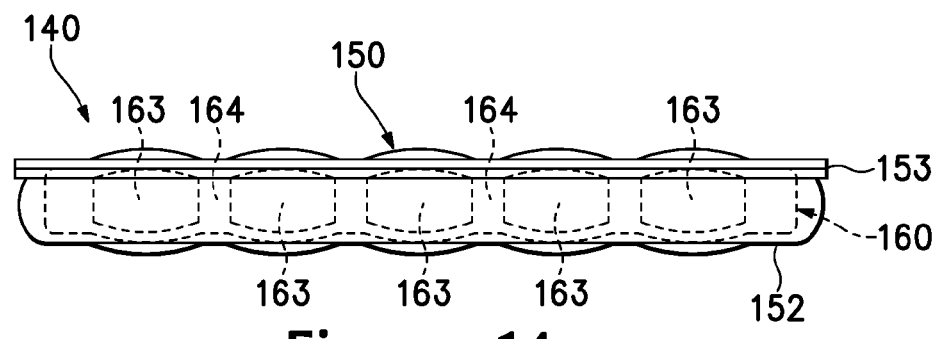
FIG. 14 is a side elevational view of the second chamber.
Figure 15A:
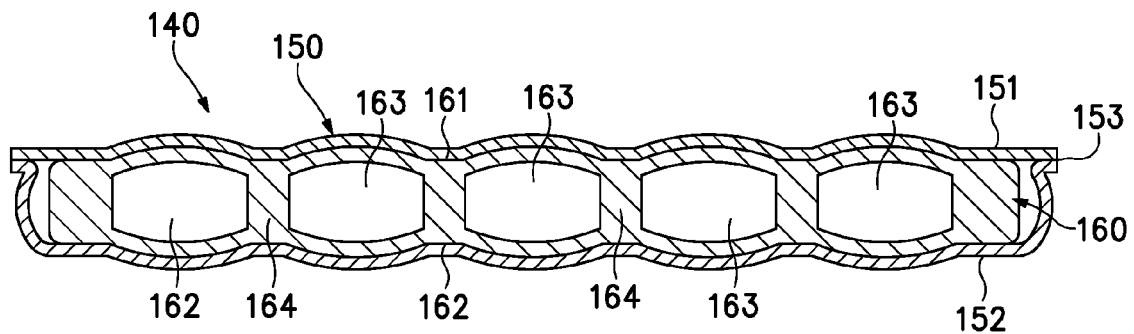
FIGS. 15A and 15B are cross-sectional views of the second chamber, as defined by section lines 15A and 15B in FIG. 13.
Figure 15B:
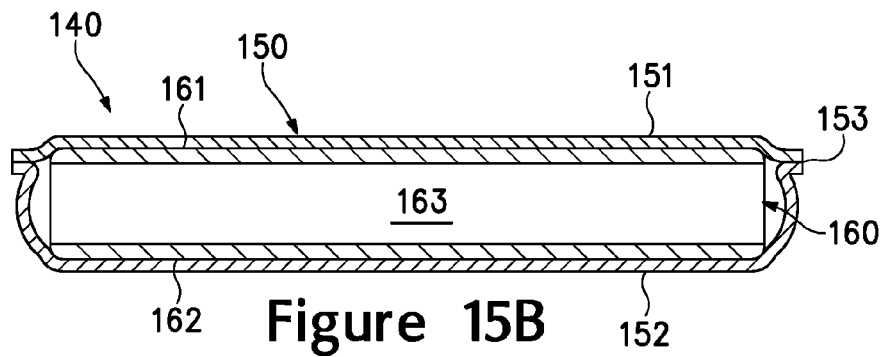

With reference to FIGS. 10 and 11A, mold 70 is depicted as having various protrusions 80 that extend outward from each of planar surface 73 and depressed surface 74. Protrusions 80 are located to correspond with the positions of cavities 63, which deflect to a greater degree than areas corresponding with columns 64. When mold portions 71 and 72 translate toward each other such that planar surface 73 and depressed surface 74 contact and compress the components of chamber 40, as depicted in FIGS. 11B and 11C, protrusions 80 ensure that the areas of tensile member 60 corresponding with cavities 63 deflect to a greater degree than the areas of tensile member 60 corresponding with columns 64. That is, protrusions 80 effectively increase the degree to which tensile member 60 and barrier layers 51 and 52 are compressed in the areas corresponding with cavities 63, thereby strengthening the bond between tensile member 60 and barrier layers 51 and 52 in the areas corresponding with cavities 63.

The degree to which tensile member 60 and barrier layers 51 and 52 are compressed by projections 80 at least partially depend upon the shapes and dimensions of projections 80. Through the application of a finite element analysis, for example, the shapes and dimensions of projections 80 may be determined so as to effectively equalize the compressive forces in areas corresponding with cavities 63 and areas corresponding with columns 64. That is, projections 80 may be shaped and dimensioned to ensure that the compressive forces between tensile member 60 and barrier layers 51 and 52 are substantially uniform across tensile member 60. By equalizing the compressive forces, the degree to which barrier layers 51 and 52 are bonded to tensile member 60 may be substantially uniform across tensile member 60.

As a further matter, a lower area of depressed surface 74 forms an elevated area that supports tensile member 60 and compresses tensile member 60. By altering the thickness of the elevated area, the degree to which the components of chamber 40 are compressed may be altered. That is, the elevated area my protrude outward to a greater degree if more compression is desired, and the elevated area my protrude outward to a lesser degree if less compression is desired. The elevated area may be utilized, therefore, to impart a specific degree of compression to the components of chamber 40. In some configurations of mold 70, second mold portion 72 may be adjustable so that the elevated area may be raised or lowered.

Second Chamber Configuration

Another chamber 140 that may be utilized with footwear 10 is depicted in FIGS. 12-15B. Chamber 140 includes an outer barrier 150 and a tensile member 160. Barrier 150, which may be formed from any of the materials discussed above for barrier 50, includes a first barrier layer 151 and a second barrier layer 152 that are substantially impermeable to a pressurized fluid contained by chamber 140. The pressurized fluid will, therefore, generally remain sealed within chamber 140 for a duration that includes the expected life of footwear 10, or fluid may diffuse into chamber 140 to sustain the pressure for the expected life of footwear 10. First barrier layer 151 and second barrier layer 152 are bonded together around their respective peripheries to form a peripheral bond 153 and cooperatively form a sealed enclosure, in which tensile member 160 and the pressurized fluid are located.

Figure 16:
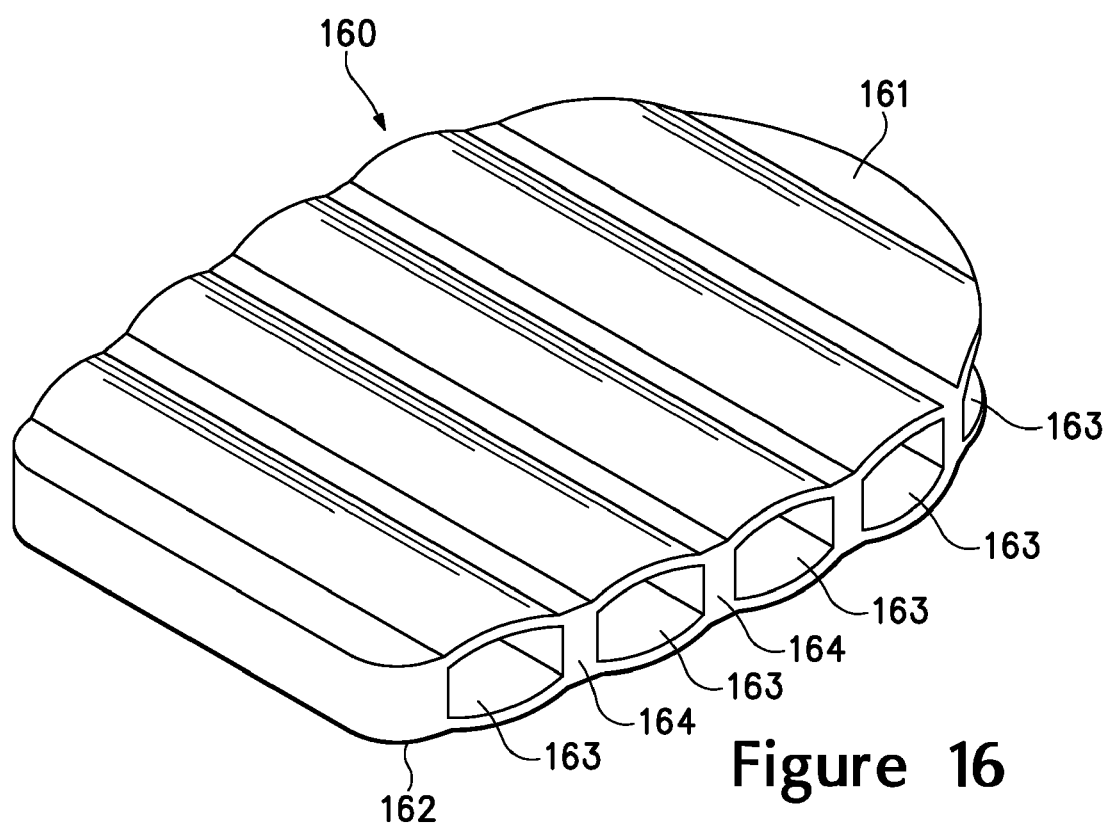
FIG. 16 is a perspective view of a tensile member of the second chamber.

Tensile member 160, which may be formed from any of the foam materials discussed above for tensile member 60, is located within barrier 150 and directly bonded to barrier 150. As depicted in FIG. 16, tensile member 160 includes a first surface 161 and an opposite second surface 162 with undulating or otherwise contoured and non-planar configurations. Whereas first surface 161 is bonded to first barrier layer 151, second surface 162 is bonded to second barrier layer 152. Tensile member 160 also defines five cavities 163 that extend entirely through the foam material of tensile member 160, thereby forming channels extending through tensile member 160. Cavities 163 define four columns 164 of the foam material that separate cavities 163 and extend between surfaces 161 and 162. Whereas surfaces 61 and 62 of tensile member 60 are substantially planar, surfaces 161 and 162 protrude outward or otherwise form contours in areas corresponding with cavities 163. That is, outward protrusions on surfaces 161 and 162 are located in areas adjacent to cavities 163. In further configurations of chamber 140, cavities 163 may only extend partially through tensile member 160 or may extend in different directions. In addition, the density or compressibility of the foam material forming various portions of tensile member 160 may vary.

As with chamber 40, the pressurized fluid contained by chamber 140 induces an outward force upon barrier 150 and tends to separate or otherwise press outward upon first barrier layer 151 and second barrier layer 152. In the absence of tensile member 160, the outward force induced by the pressurized fluid would impart a rounded or otherwise bulging configuration to chamber 140. Tensile member 160 is, however, bonded to each of first barrier layer 151 and second barrier layer 152 to restrain the separation of barrier layers 151 and 152. Accordingly, portions of tensile member 160 are placed in tension by the fluid and retain the configuration of chamber 140 that is depicted in the figures. The fluid located within chamber 140 may be any of the fluids discussed above for chamber 40.

Manufacturing Process For Second Chamber

The manufacturing process for chamber 140 is substantially similar to the manufacturing process discussed above for chamber 40. An advantage to tensile member 160 is that the contours in surfaces 161 and 162 ensure that the compressive forces between tensile member 160 and barrier layers 151 and 152 are substantially uniform across tensile member 160 in the absence of protrusions 80. That is, the contours equalize the compressive forces such that the degree to which barrier layers 151 and 152 are bonded to tensile member 160 is substantially uniform across tensile member 160. Accordingly, chamber 140 may be uniformly-bonded without incorporating structures such as protrusions 80 into mold 70.

Figure 17A:
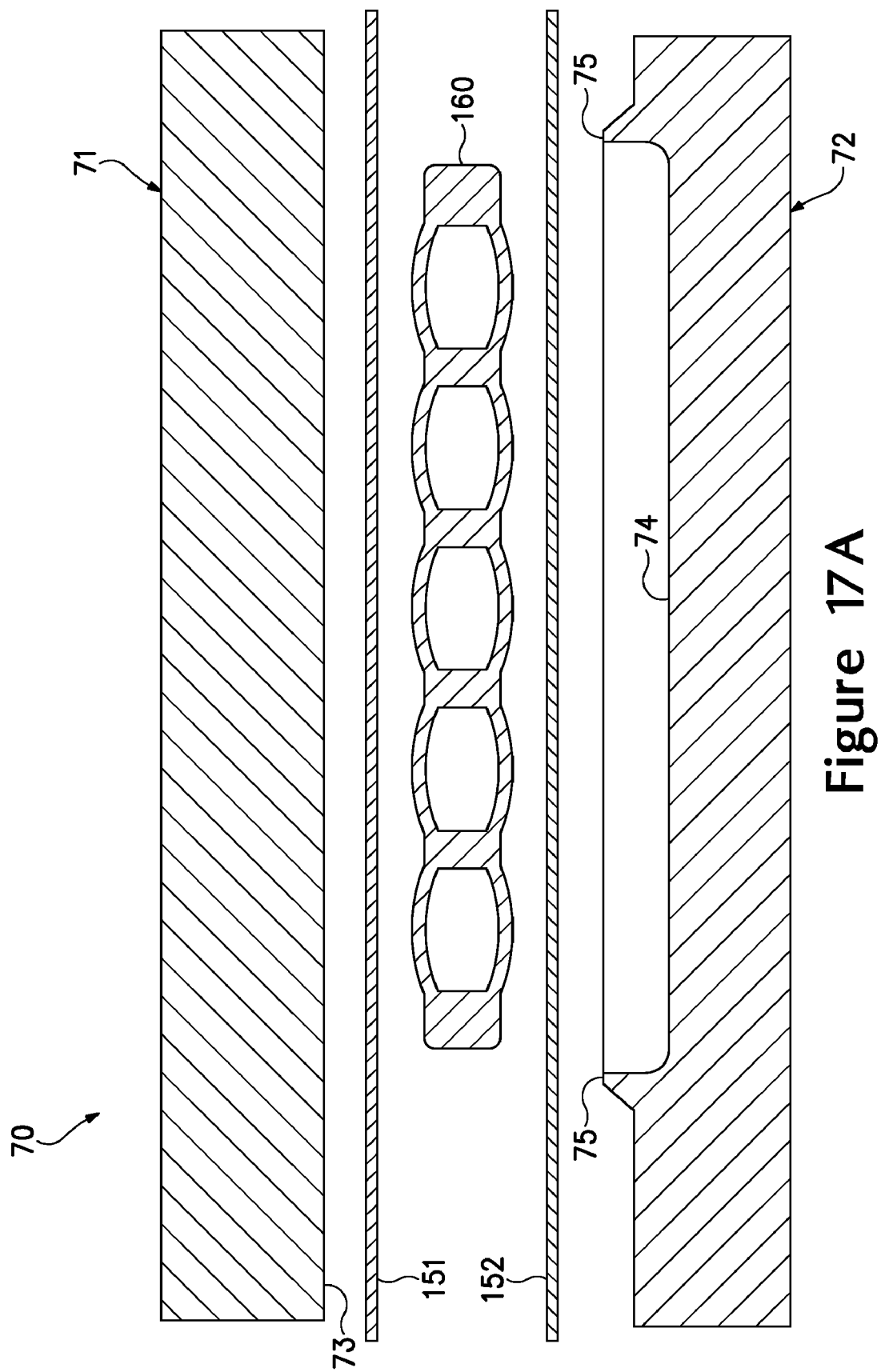
FIGS. 17A-17C are schematic cross-sectional views of the mold, as defined by section line 8 in FIG. 7, depicting steps in a manufacturing process for the second chamber.
Figure 17B:
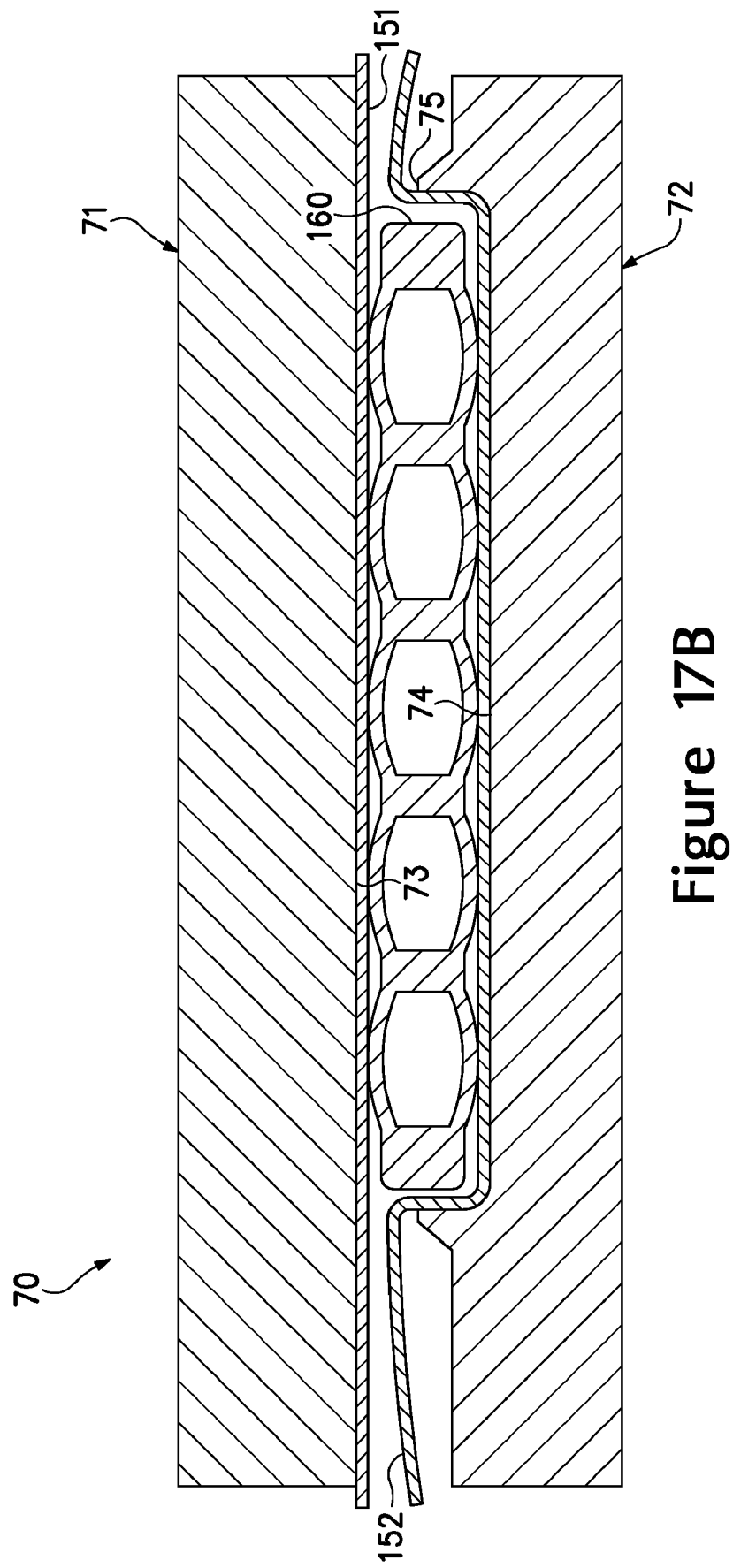
Figure 17C:
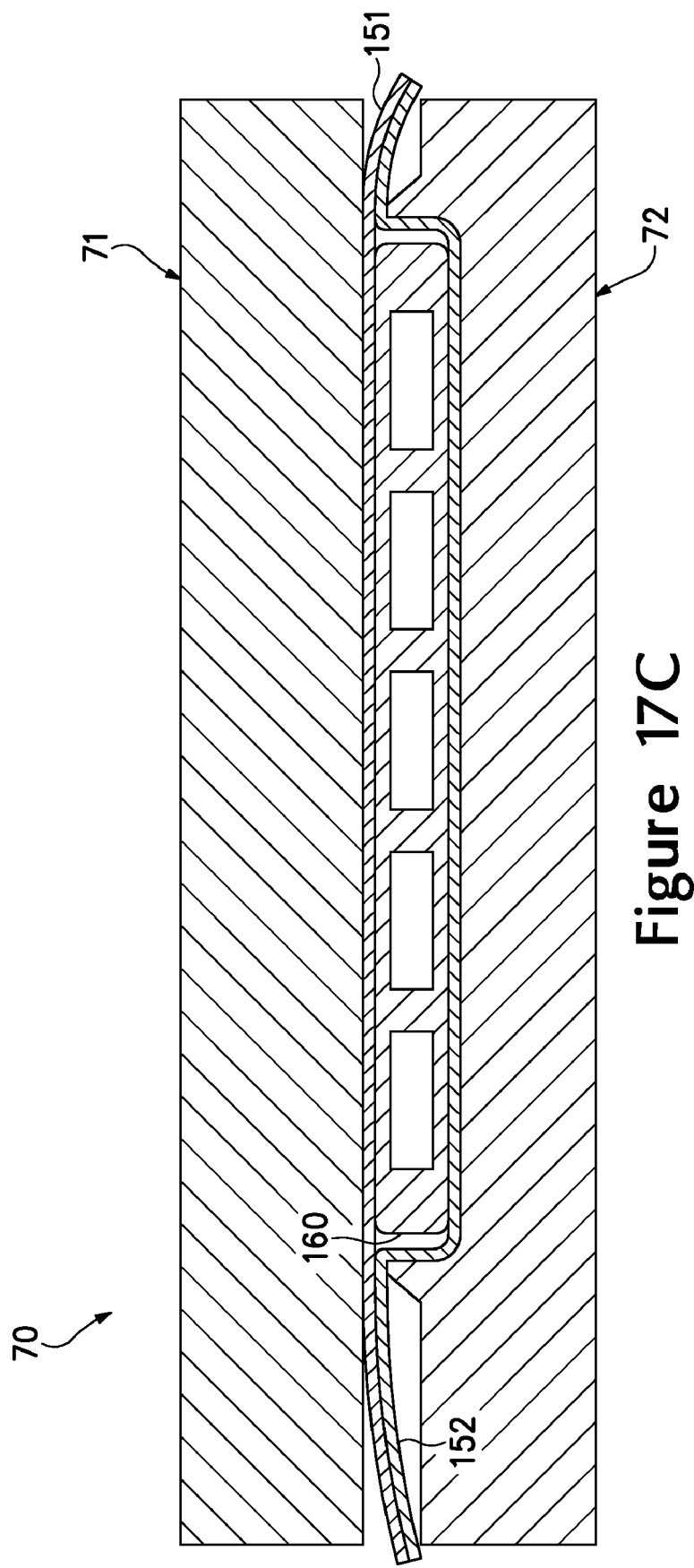
Figure 18:
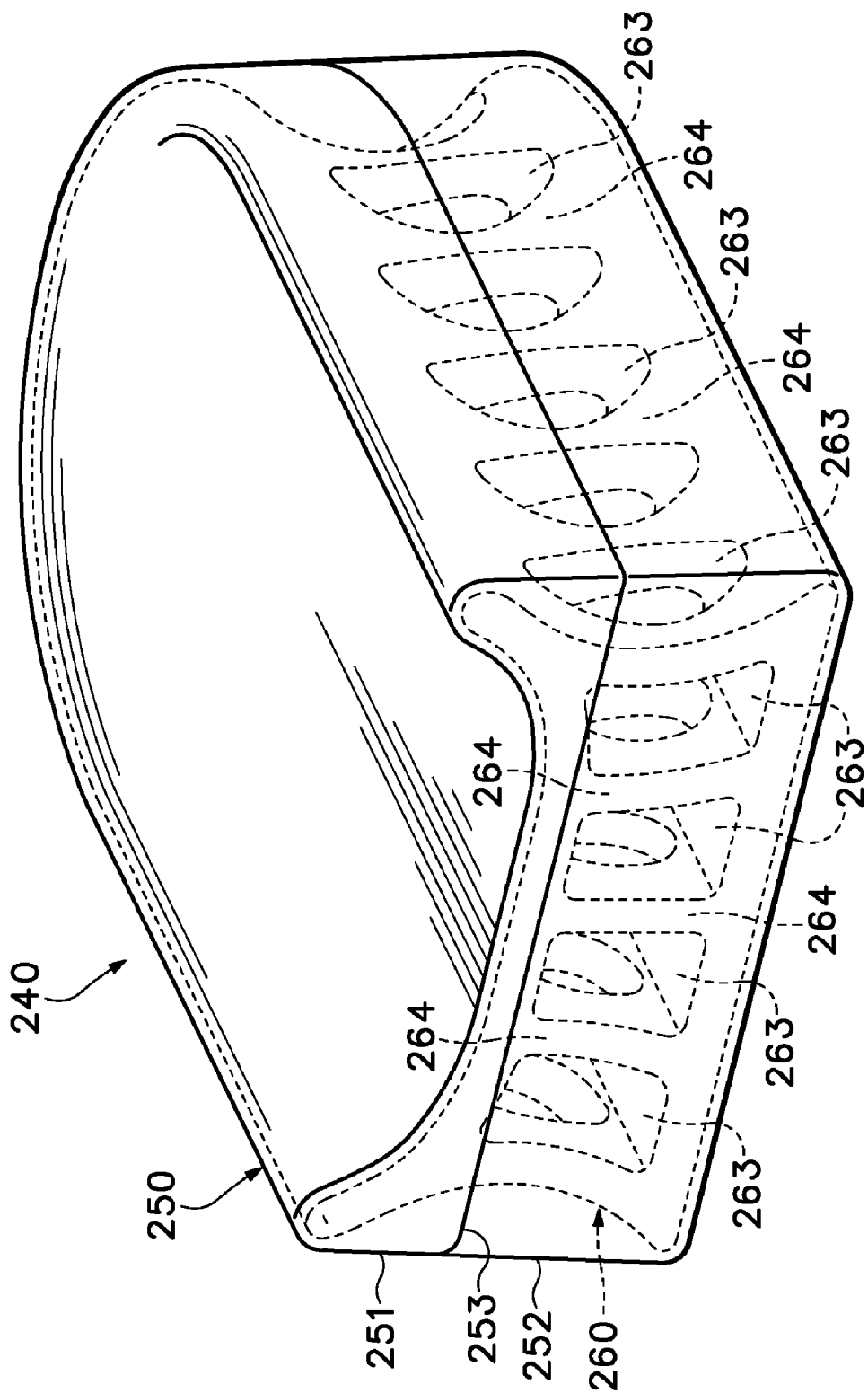
FIG. 18 is a perspective view of a third chamber.

With reference to FIG. 17A, tensile member 160 and each of barrier layers 151 and 152 are located between mold portions 71 and 72 of mold 70. When mold portions 71 and 72 translate toward each other, planar surface 73 and depressed surface 74 contact each of barrier layers 151 and 152. As depicted in FIG. 17B, the first portions of tensile member 160 that are compressed between barrier layers 151 and 152 are the contoured areas corresponding with cavities 163. That is, mold 70 initially compresses the areas corresponding with cavities 163. As mold portions 71 and 72 continue to translate toward each other, as depicted in FIG. 17C, all of tensile member 160 is compressed between barrier layers 151 and 152.

In a manner that is similar to chamber 40, areas corresponding with cavities 163 deflect more easily than areas corresponding with columns 164. By forming outward contours in surfaces 161 and 162, however, the areas that correspond with cavities 163 are compressed prior to the areas that correspond with columns 164, as depicted in FIG. 17B. As tensile member 160 is compressed further, as in FIG. 17C, the outward contours in the areas that correspond with cavities 163 are already compressed to a degree that substantially equalizes the compressive forces across tensile member 160. That is, the outward contours of tensile member 160 effectively increase the degree to which tensile member 160 and barrier layers 151 and 152 are compressed in areas corresponding with cavities 163. Accordingly, by initially compressing the outward contours, a uniform bond may be formed between tensile member 160 and barrier layers 151 and 152.

Third Chamber Configuration

Another chamber 240 that may be utilized with footwear 10 is depicted in FIGS. 18-23B. Chamber 240 includes an outer barrier 250 and a tensile member 260. Barrier 250 includes a first barrier layer 251 and a second barrier layer 252 that are substantially impermeable to a pressurized fluid contained by chamber 240. The pressurized fluid contained by chamber 240 induces an outward force upon barrier 250 and tends to separate or otherwise press outward upon first barrier layer 251 and second barrier layer 252. Tensile member 260, however, is bonded to each of first barrier layer 251 and second barrier layer 252 and is placed in tension by the pressurized fluid, thereby restraining outward movement of barrier 250.

First barrier layer 251 and second barrier layer 252 are bonded together around their respective peripheries to form a peripheral bond 253 and cooperatively form a sealed enclosure, in which tensile member 260 and the pressurized fluid are located. Suitable materials for barrier 250 include any of the materials discussed above for barrier 50. Tensile member 260 is a polymer foam member that is bonded to barrier 250. Although adhesive bonding may be utilized to secure barrier 250 and tensile member 260, direct bonding may also be suitable when at least one of barrier 250 and tensile member 260 are formed from a thermoplastic polymer material. Suitable materials for tensile member 260 include any of the materials discussed above for tensile member 60. Similarly, any of the fluids discussed above for chamber 40 may be utilized within chamber 240

Tensile member 60, as discussed above, has a configuration wherein surfaces 61 and 62 are both planar and parallel. In contrast, tensile member 260 includes a first surface 261 with a concave configuration, and tensile member 260 includes a second surface 262 that is generally planar. The concave configuration of first surface 261 provides bladder 240 with a concave upper area that may join with upper 20 and form a depression for securely receiving the heel of the foot. Similarly, the planar configuration of second surface 262 provides chamber 240 with a generally planar lower area that joins with outsole 32. The various contours of surfaces 261 and 262 may vary significantly from the configuration discussed above. For example, second surface 262 may incorporate a bevel in a rear-lateral corner of footwear 10, or both surfaces may be planar.

Tensile member 260 includes a plurality of intersecting cavities 263 that extend through the polymer foam material, thereby forming channels extending through tensile member 260. Some of cavities 263 extend longitudinally from a front portion of tensile member 260 to a back portion of tensile member 260, and other cavities 263 extend laterally between sides of tensile member 260. Cavities 263 increase the compressibility of tensile member 260 and decrease the overall weight of chamber 240. In other configurations, cavities 263 may extend only partially through tensile member 260, rather than extending entirely through tensile member 260. Cavities 263 form a plurality of columns 264 that extend between surfaces 261 and 262 of tensile member 260. The dimensions of columns 264 may vary significantly depending upon the quantity and dimensions of cavities 263.

Figure 19:
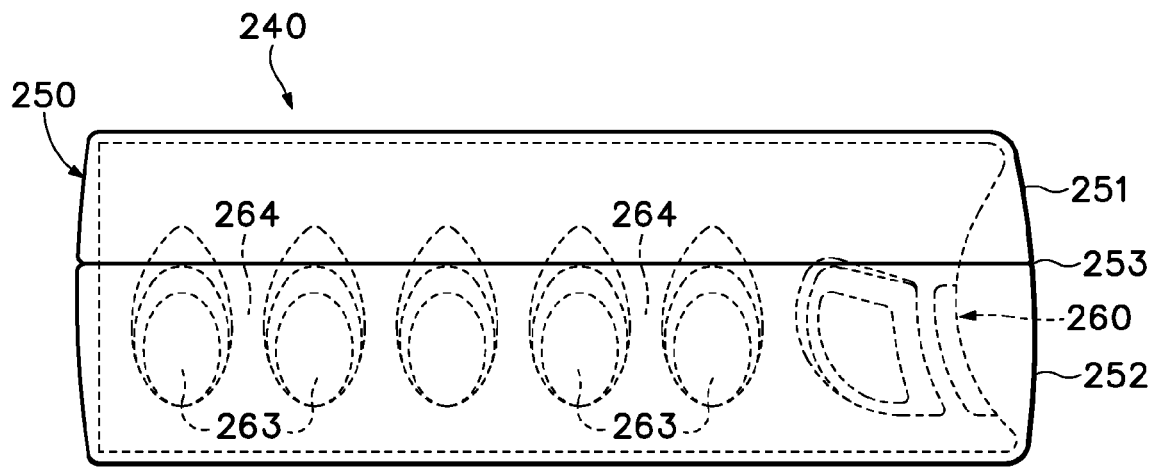
FIG. 19 is a side elevational view of the third chamber.
Figure 20:
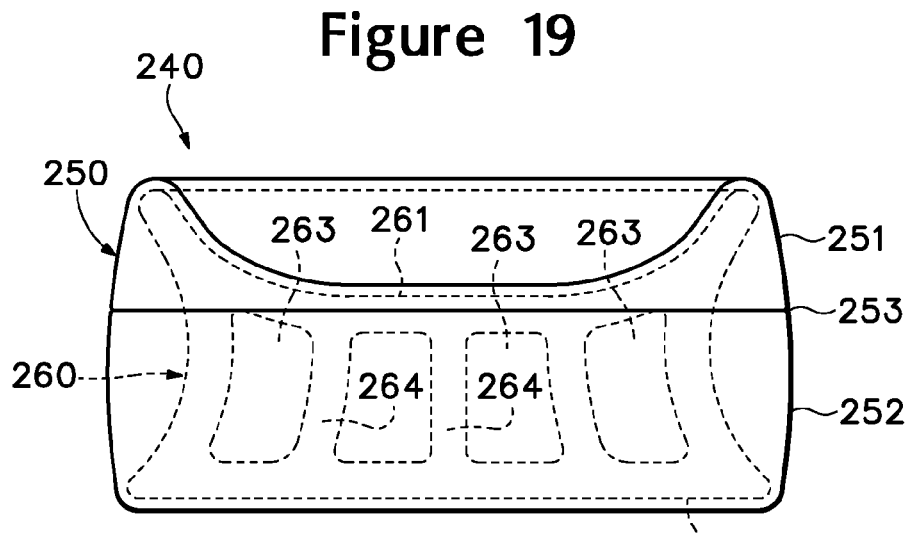
FIG. 20 is a front elevational view of the third chamber.
Figure 21:
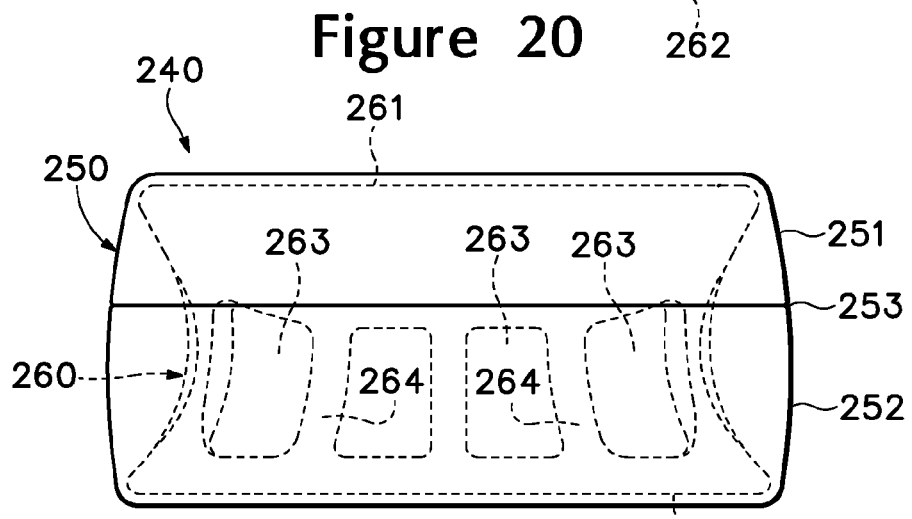
FIG. 21 is a rear elevational view of the third chamber.
Figure 22:
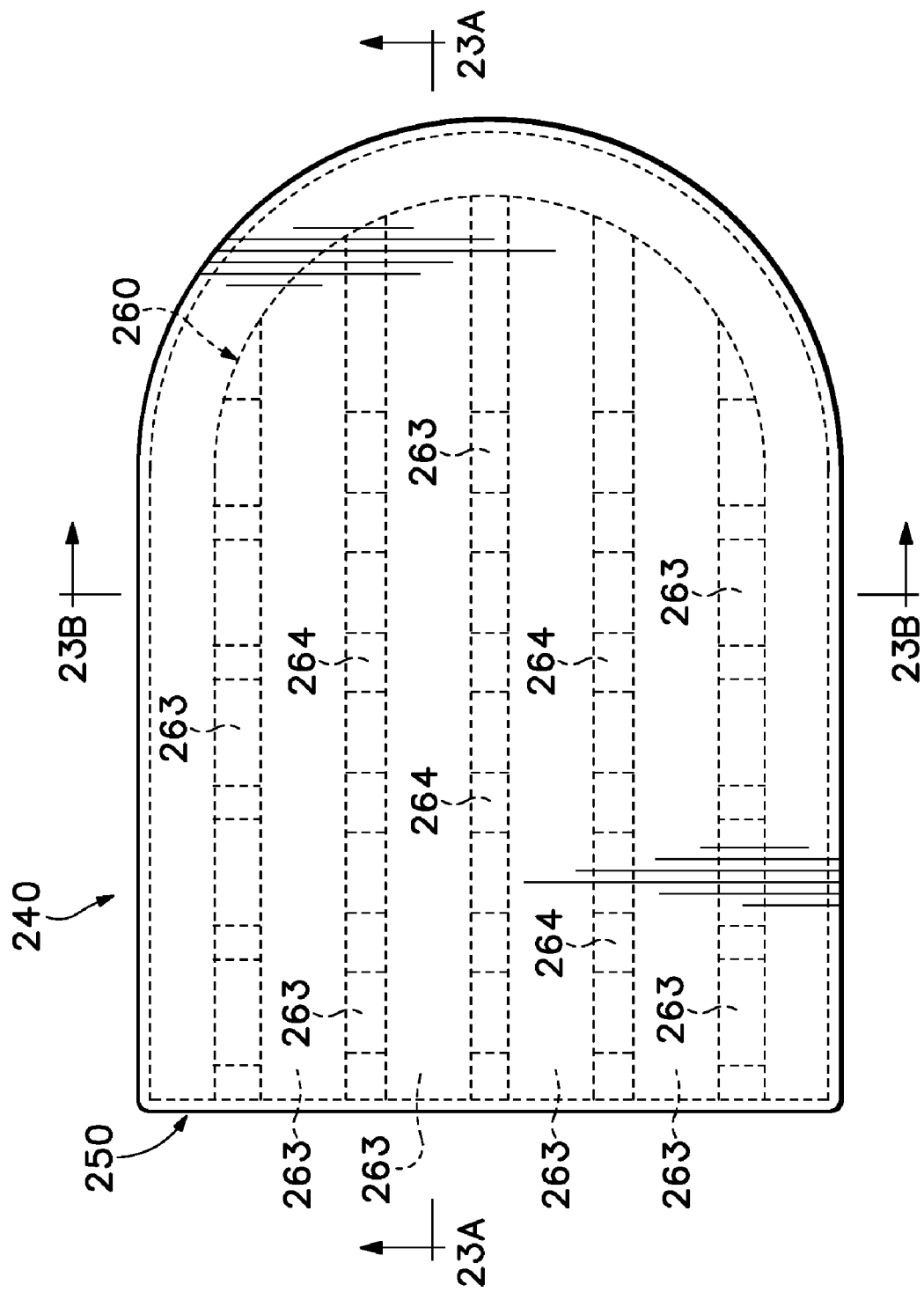
FIG. 22 is a top plan view of the third chamber.
Figure 23A:
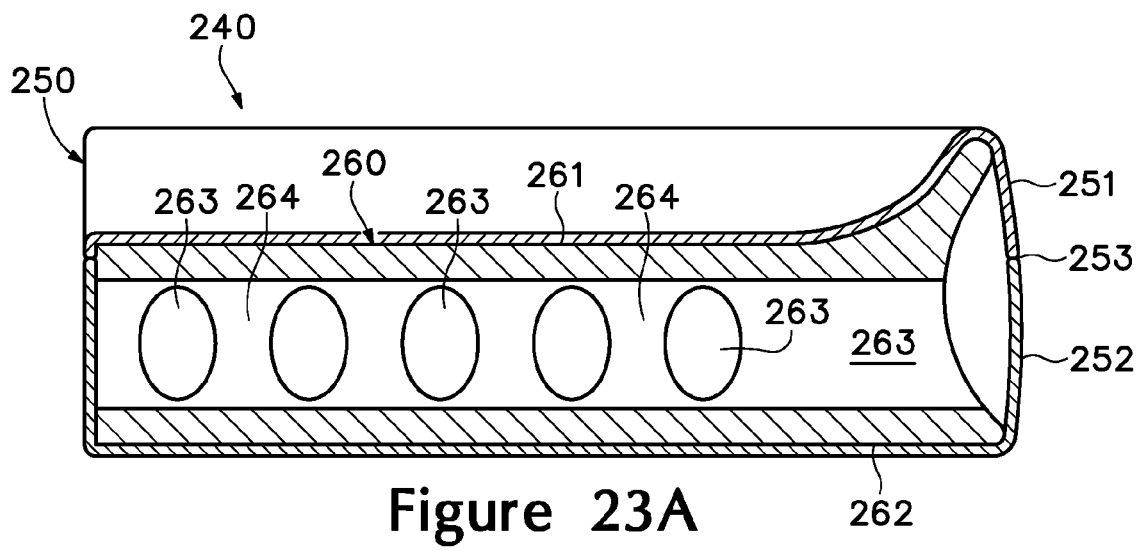
FIGS. 23A and 23B are cross-sectional views of the third chamber, as defined by section lines 23A and 23B in FIG. 22.
Figure 23B:
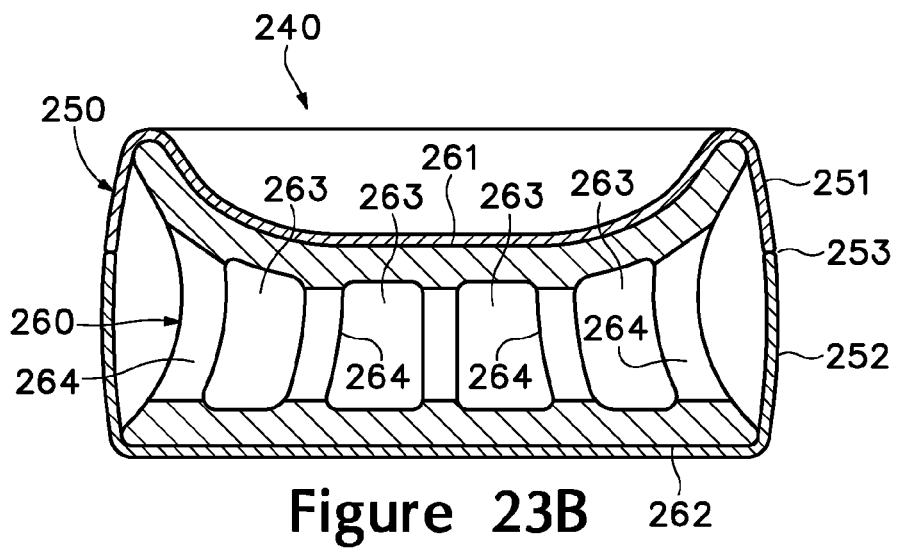
Figure 24:
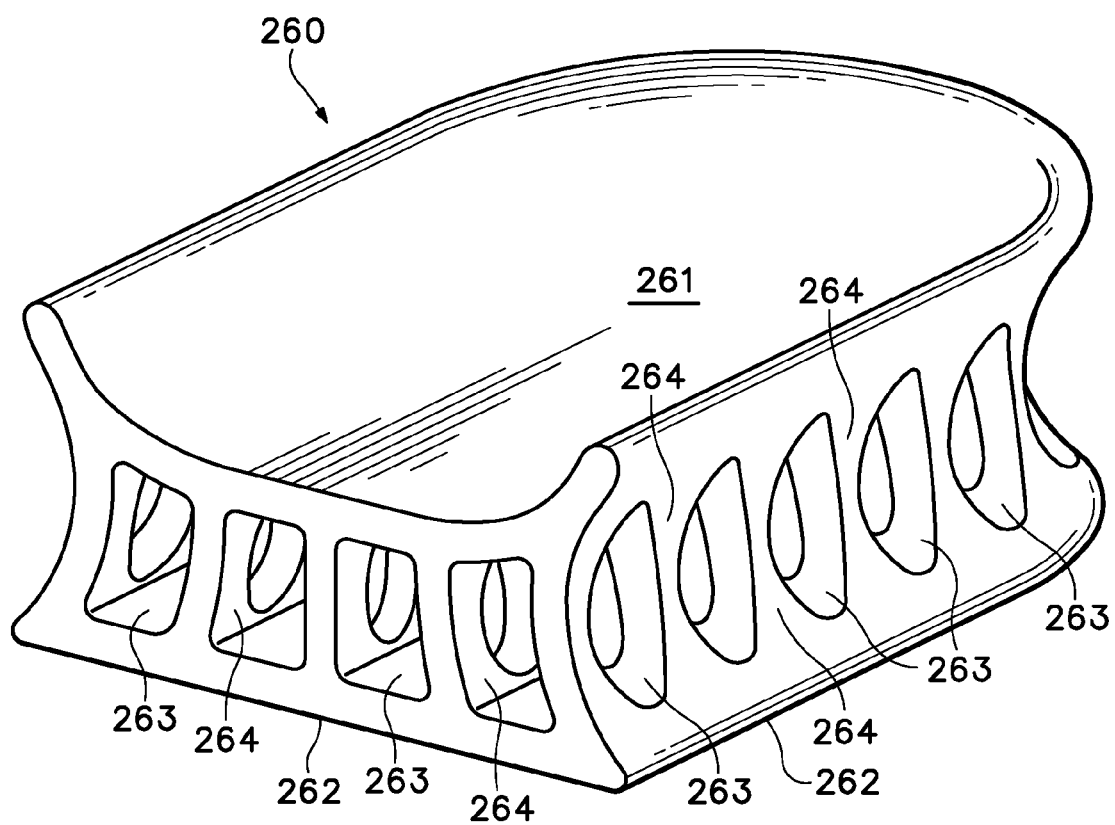
FIG. 24 is a perspective view of a tensile member of the third chamber.

The cavities 263 that extend along the longitudinal length of tensile member 240 exhibit a shape that is generally rectangular, as depicted in FIGS. 20 and 21. In addition, the cavities 263 that extend between sides of tensile member 260 exhibit a shape that is generally oval, as depicted in FIG. 19. Although these are suitable shapes for cavities 263, the shapes of cavities 263 may vary to include circular, triangular, hexagonal, or other regular or non-regular configurations. Cavities 263 are also depicted as having a constant shape through the length and width of tensile member 260, but may have a non-constant, varying shape or varying dimensions. Accordingly, the configurations of cavities 263 may vary to impart different compressibilities or properties to different portions of tensile member 260. For example, cavities 263 may have greater dimensions in the rear-lateral portion of tensile member 260 in order to decrease the overall compressibility of sole structure 30 in the rear-lateral corner.

Tensile member 260 may be formed through an injection molding process wherein the polymer foam is injected into a mold having a cavity with the general shape of tensile member 260. Various removable rods may extend through the cavity in locations that correspond with the positions of cavities 263. Upon at least partial curing of the polymer foam, the rods may be removed and the mold may be opened to permit removal of tensile member 260.

Manufacturing Process For Third Chamber

Figure 25A:
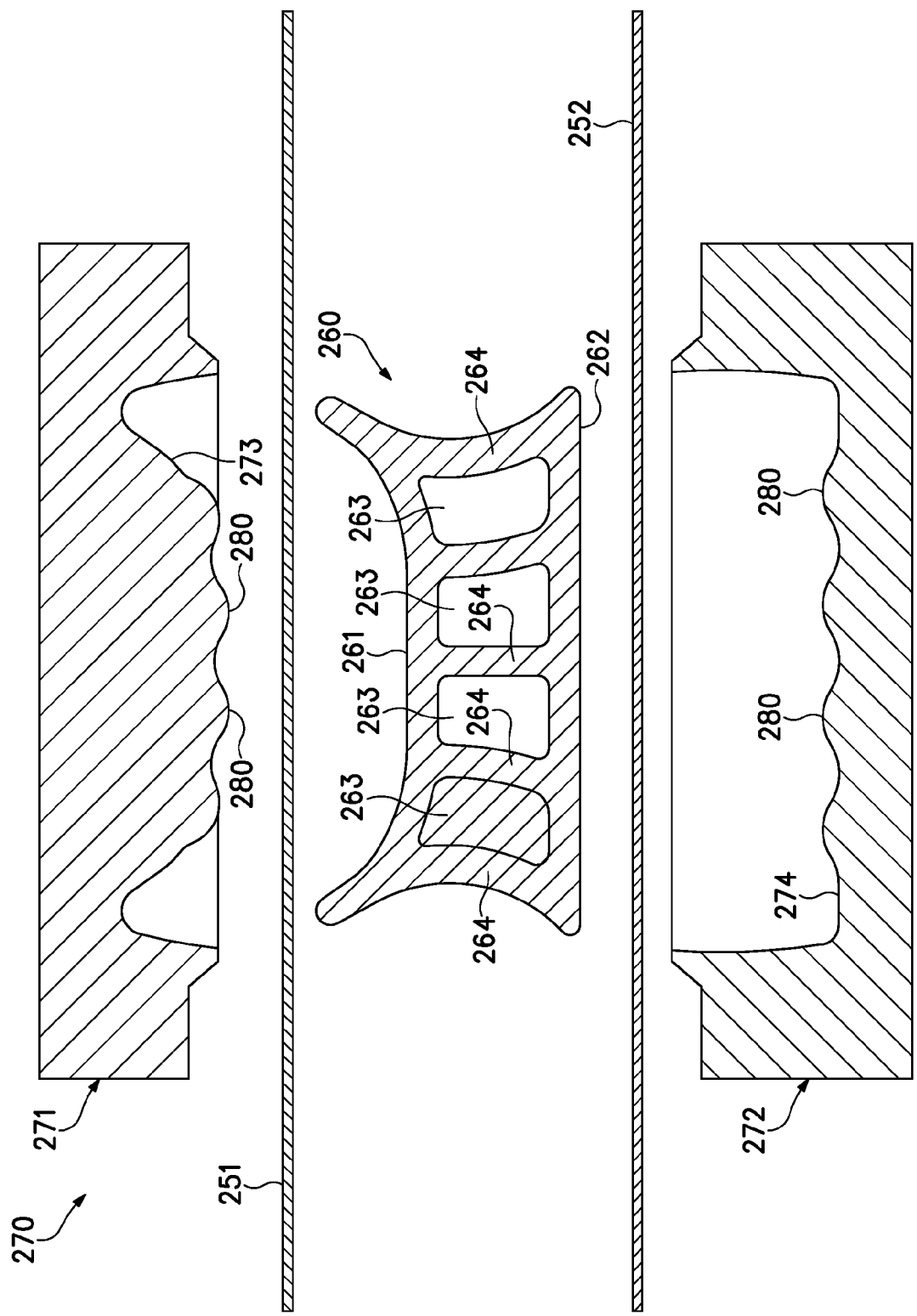
FIGS. 25A-25C are schematic cross-sectional views of a mold depicting steps in a manufacturing process for the third chamber.
Figure 25B:
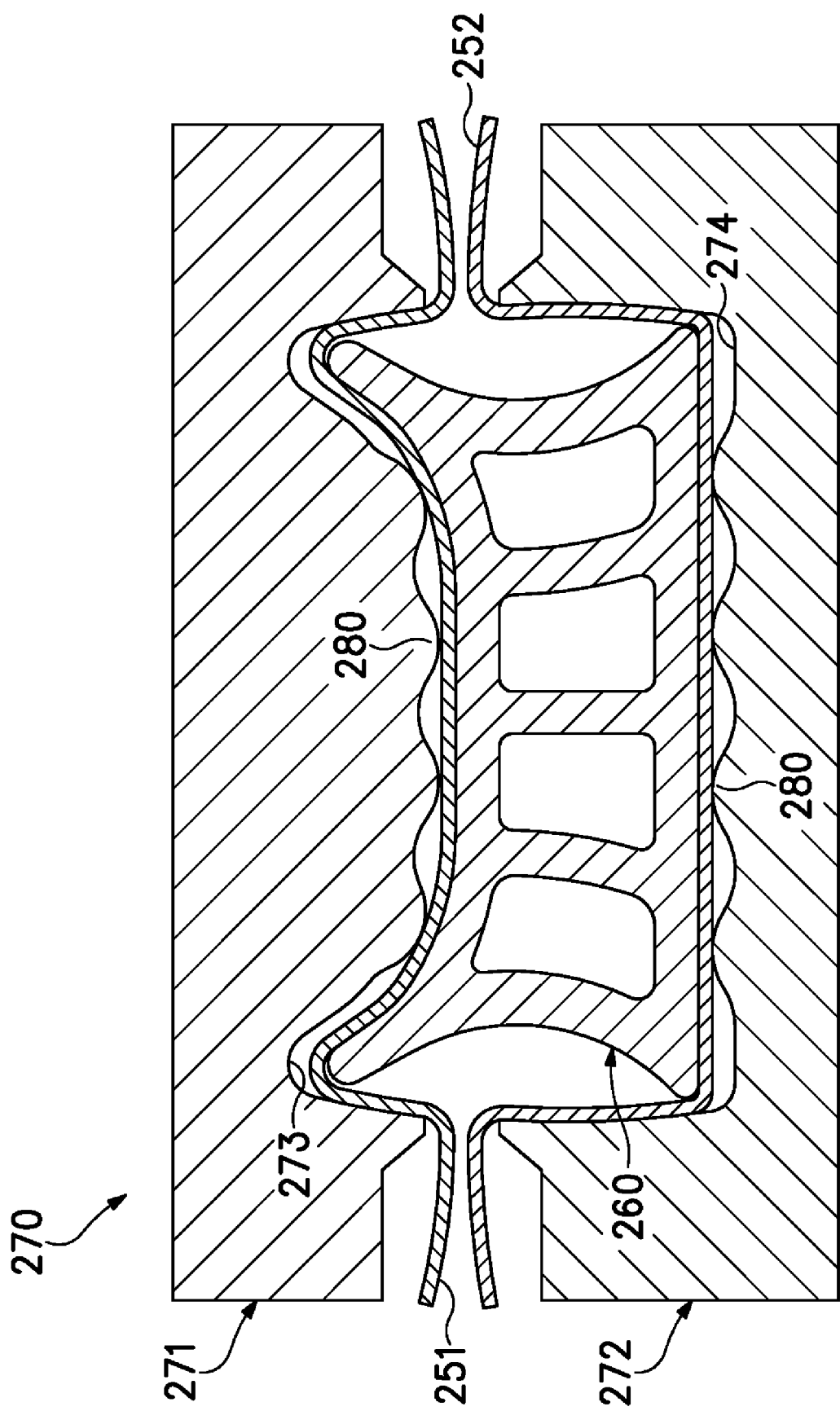
Figure 25C:
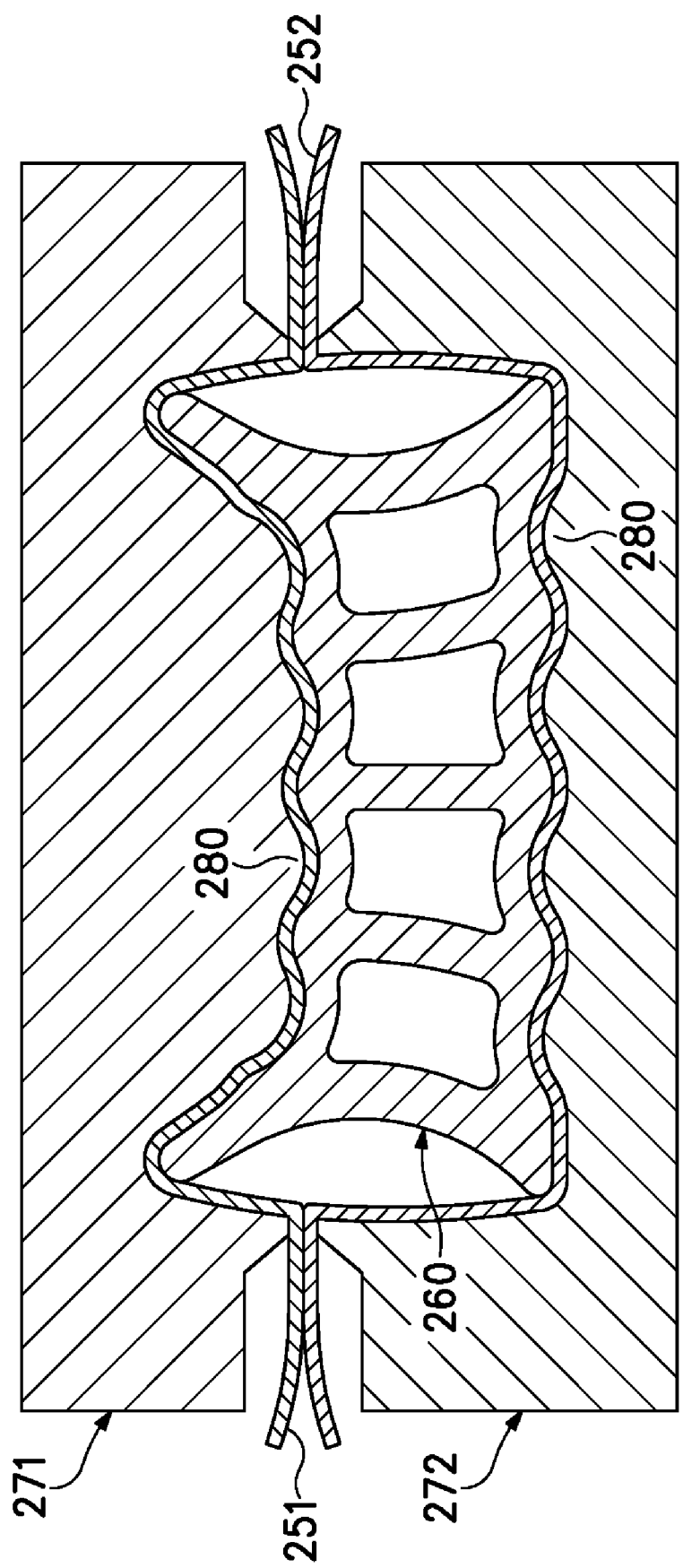
Figure 26:
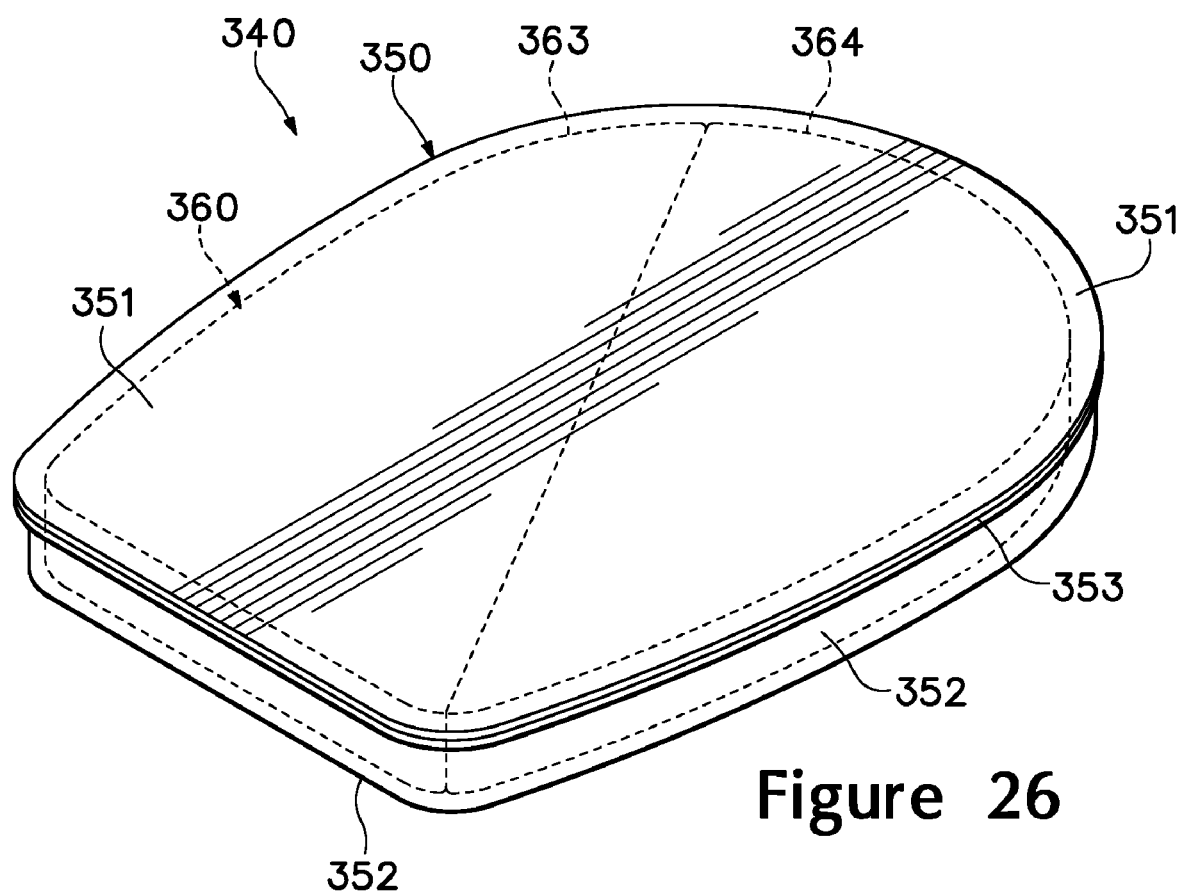
FIG. 26 is a perspective view of a fourth chamber.
Figure 27:
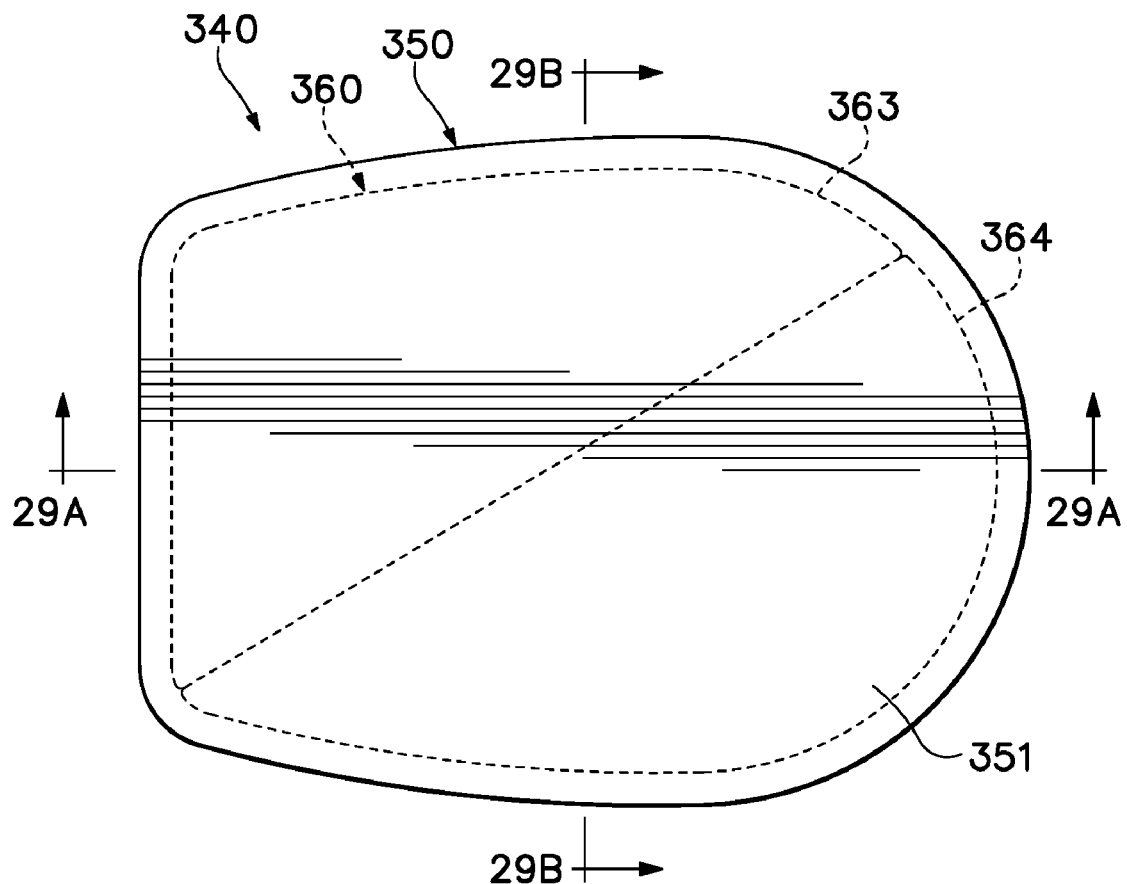
FIG. 27 is a top plan view of the fourth chamber.
Figure 28:
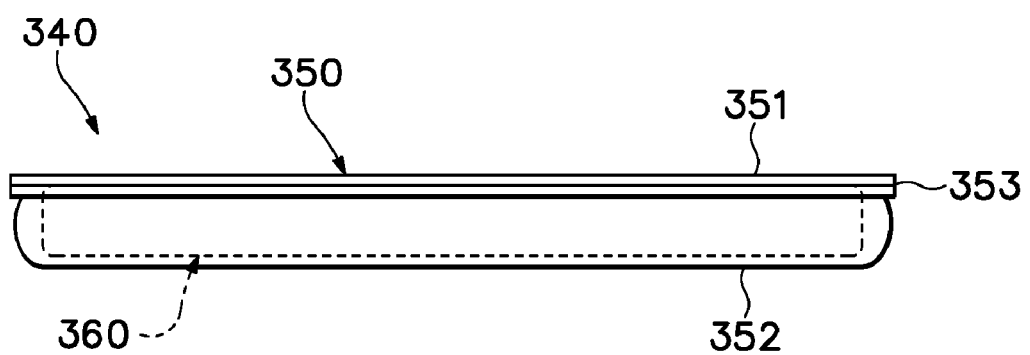
FIG. 28 is a side elevational view of the fourth chamber.
Figure 29A:
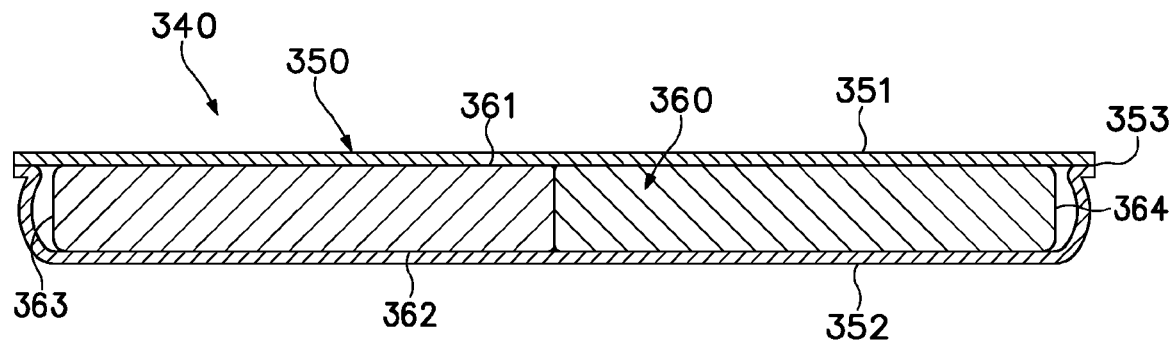
FIGS. 29A and 29B are cross-sectional views of the fourth chamber, as defined by section lines 29A and 29B in FIG. 27.
Figure 29B:
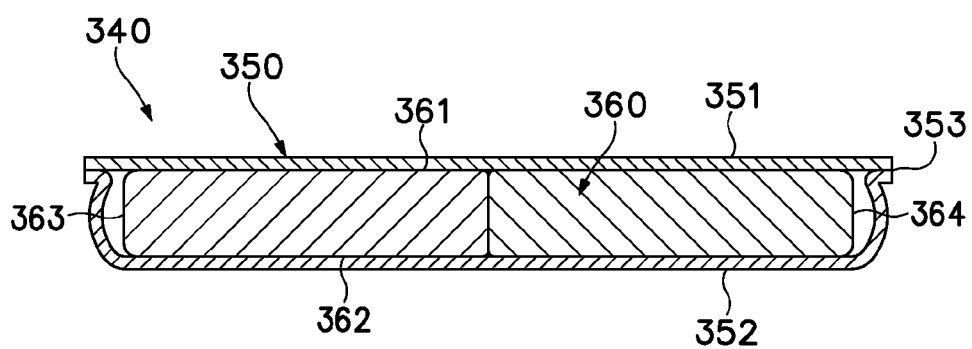

Although a variety of manufacturing processes may be utilized to form chamber 240, an example of a suitable thermoforming process will now be discussed. With reference to FIGS. 25A-25C, a mold 270 that may be utilized in the thermoforming process is depicted as including a first mold portion 271 and a second mold portion 272. Mold 270 is utilized to form chamber 240 from a pair of polymer sheets (i.e., first barrier layer 251 and second barrier layer 252) and tensile member 260. More particularly, mold 270 facilitates the thermoforming process by (a) imparting shape to first barrier layer 251 and second barrier layer 252, (b) joining a periphery of first barrier layer 251 and second barrier layer 252 to form peripheral bond 253, and (c) bonding tensile member 260 to first barrier layer 251 and second barrier layer 252.

As discussed above, tensile member 260 defines various cavities 263 that extend entirely through the foam material, and cavities 263 define various columns 264 that extend between surfaces 261 and 262. Cavities 263 and columns 264 effectively form areas of tensile member 260 that compress to different degrees. More particularly, a compressive force exerted upon a portion of tensile member 260 corresponding with a location of one of cavities 263 will cause a greater deflection than a compressive force exerted upon a portion of tensile member 260 corresponding with a location of one of columns 264. Accordingly, areas corresponding with cavities 263 deflect more easily than areas corresponding with columns 264.

Mold 270 is depicted as having various protrusions 280 that extend outward from a surface 273 in first mold portion 271 and from a surface 274 in second mold portion 272. Protrusions 280 are located to correspond with the positions of cavities 263, which deflect to a greater degree than areas corresponding with columns 264. When mold portions 271 and 272 translate toward each other such that surfaces 273 and 274 contact and compress the components of chamber 240, protrusions 280 ensure that the areas of tensile member 260 corresponding with cavities 263 deflect to a greater degree than the areas of tensile member 260 corresponding with columns 264. That is, protrusions 280 effectively increase the degree to which tensile member 260 and barrier layers 251 and 252 are compressed in the areas corresponding with cavities 263, thereby strengthening the bond between tensile member 260 and barrier layers 251 and 252 in the areas corresponding with cavities 263.

The thermoforming process for chamber 240 is substantially similar to the processes discussed above for chamber 40. In general, therefore, the components of chamber 240 are heated. With reference to FIG. 25A, tensile member 260 and each of barrier layers 251 and 252 are located between mold portions 271 and 272. When mold portions 271 and 272 translate toward each other, surfaces 273 and 274 contact each of barrier layers 251 and 252, as depicted in FIG. 25B. More particularly, the first portions of mold 270 that contacts tensile member 260 are protrusions 280. That is, mold 270 initially compresses the areas corresponding with cavities 263. As mold portions 271 and 272 continue to translate toward each other, as depicted in FIG. 25C, all of tensile member 260 is compressed between barrier layers 251 and 252. Given that the areas corresponding with cavities 263 exhibit greater deflection and are compressed more by protrusions 280, the bond between tensile member 260 and barrier layers 251 and 252 will be substantially uniform across the surface of tensile member 260. That is, the strength of different areas of the bond between tensile member 260 may be substantially constant.

The degree to which tensile member 260 and barrier layers 251 and 252 are compressed by projections 280 at least partially depend upon the shapes and dimensions of projections 280. Through the application of a finite element analysis, for example, the shapes and dimensions of projections 280 may be determined so as to effectively equalize the compressive forces in areas corresponding with cavities 263 and areas corresponding with columns 264. That is, projections 280 may be shaped and dimensioned to ensure that the compressive forces between tensile member 260 and barrier layers 251 and 252 are substantially uniform across tensile member 260. By equalizing the compressive forces, the degree to which barrier layers 251 and 252 are bonded to tensile member 260 may be substantially uniform across tensile member 260.

Another factor that may affect the uniformity of compressive forces on tensile member 260 is the contours of first surface 261. Whereas a central area of first surface 261 is generally perpendicular to the direction that mold portions 271 and 272 translate, peripheral areas of first surface 261 angle upwards. Downward forces from first mold portion 271 are not, therefore, perpendicular to the interface between first barrier layer 251 and first surface 261 in the peripheral areas of first surface 261. This offset between the directions of the compressive force and the interface between first barrier layer 251 and first surface 261 may also affect the degree to which first barrier layer 251 is bonded to first surface 261. Through the application of a finite element analysis, however, surface 273 of first mold portion 271 may be shaped to account for the contours in tensile member 260. Accordingly, the finite element analysis may shape mold 270 in a manner that provides substantially uniform bonding as a result of both (a) difference in deflection from the presence of cavities 263 and columns 264 and (b) contours on surfaces of tensile member 260.

Fourth Chamber Configuration

Another chamber 340 that may be utilized with footwear 10 is depicted in FIGS. 26-29B. Chamber 340 includes an outer barrier 350 and a tensile member 360. Barrier 350, which may be formed from any of the materials discussed above for barrier 50, includes a first barrier layer 351 and a second barrier layer 352 that are substantially impermeable to a pressurized fluid contained by chamber 340. First barrier layer 351 and second barrier layer 352 are bonded together around their respective peripheries to form a peripheral bond 353 and cooperatively form a sealed enclosure, in which tensile member 360 and the pressurized fluid are located.

Figure 30:
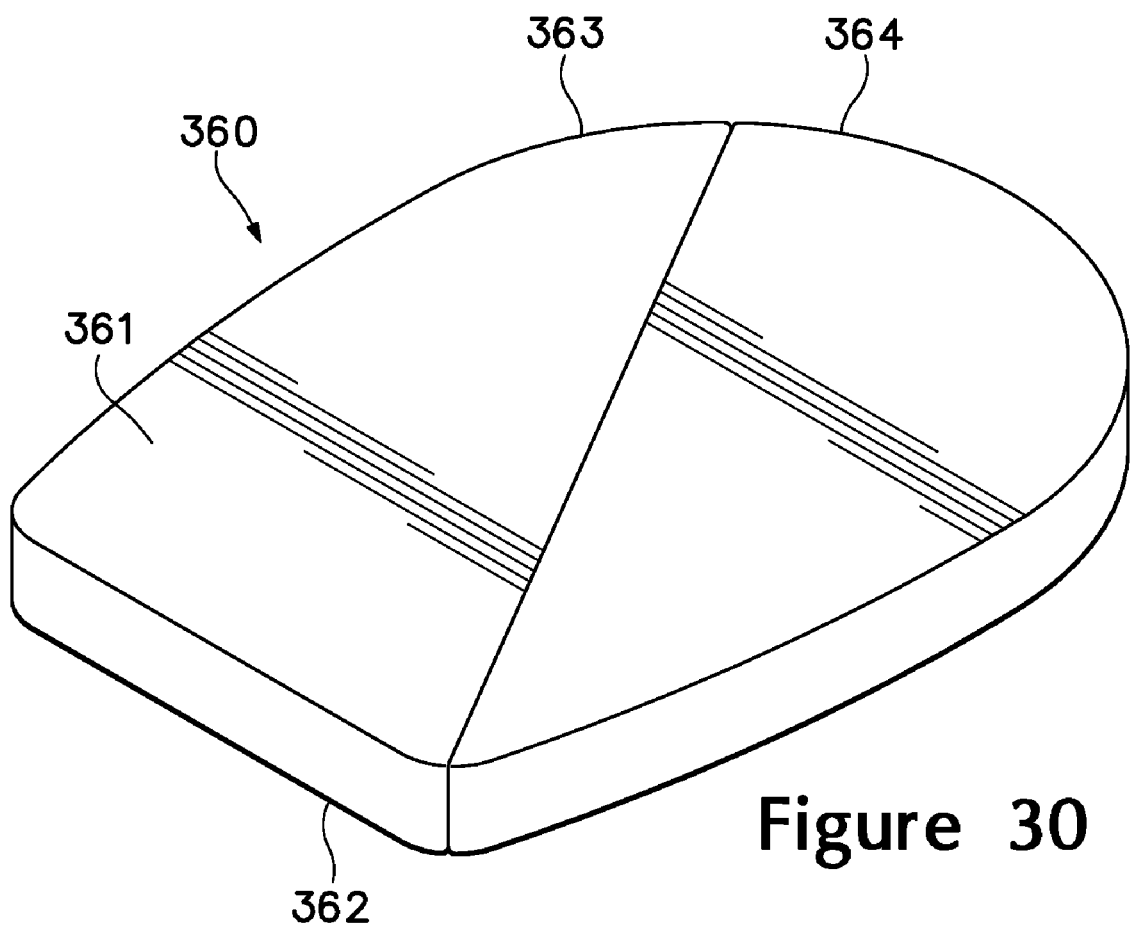
FIG. 30 is a perspective view of a tensile member of the fourth chamber.

Tensile member 360, which may be formed from any of the foam materials discussed above for tensile member 60, is located within barrier 350 and directly bonded to barrier 350. As depicted in FIG. 30, tensile member 360 includes a first surface 361 and an opposite second surface 362 with substantially planar configurations. Whereas first surface 361 is bonded to first barrier layer 351, second surface 362 is bonded to second barrier layer 352. In contrast with tensile members 40, 140, and 240, tensile member 360 has a solid configuration wherein cavities are absent, and the density or compressibility of the foam material forming various portions of tensile member 360 varies. More particularly, one half of tensile member 360 is formed from a foam material 363 and the other half of tensile member 360 is formed from a foam material 364. In comparison, foam material 363 is more dense and less compressible than foam material 364.

As with chamber 40, the pressurized fluid contained by chamber 340 induces an outward force upon barrier 350 and tends to separate or otherwise press outward upon first barrier layer 351 and second barrier layer 352. In the absence of tensile member 360, the outward force induced by the pressurized fluid would impart a rounded or otherwise bulging configuration to chamber 340. Tensile member 360, however, is bonded to each of first barrier layer 351 and second barrier layer 352 to restrain the separation of barrier layers 351 and 352. Accordingly, portions of tensile member 360 are placed in tension by the fluid and retain the configuration of chamber 340 that is depicted in the figures. The fluid within chamber 340 may be any of the fluids discussed above for chamber 40.

Manufacturing Process For Fourth Chamber

As discussed above, tensile member 360 has a solid configuration that is formed from foam materials 363 and 364, which have different densities. Foam materials 363 and 364 effectively form areas of tensile member 360 that compress to different degrees. More particularly, a compressive force exerted upon foam material 364 will cause a greater deflection than a compressive force exerted upon foam material 363. Accordingly, areas corresponding with foam material 364 deflect more easily than areas corresponding with foam material 363.

Figure 31A:
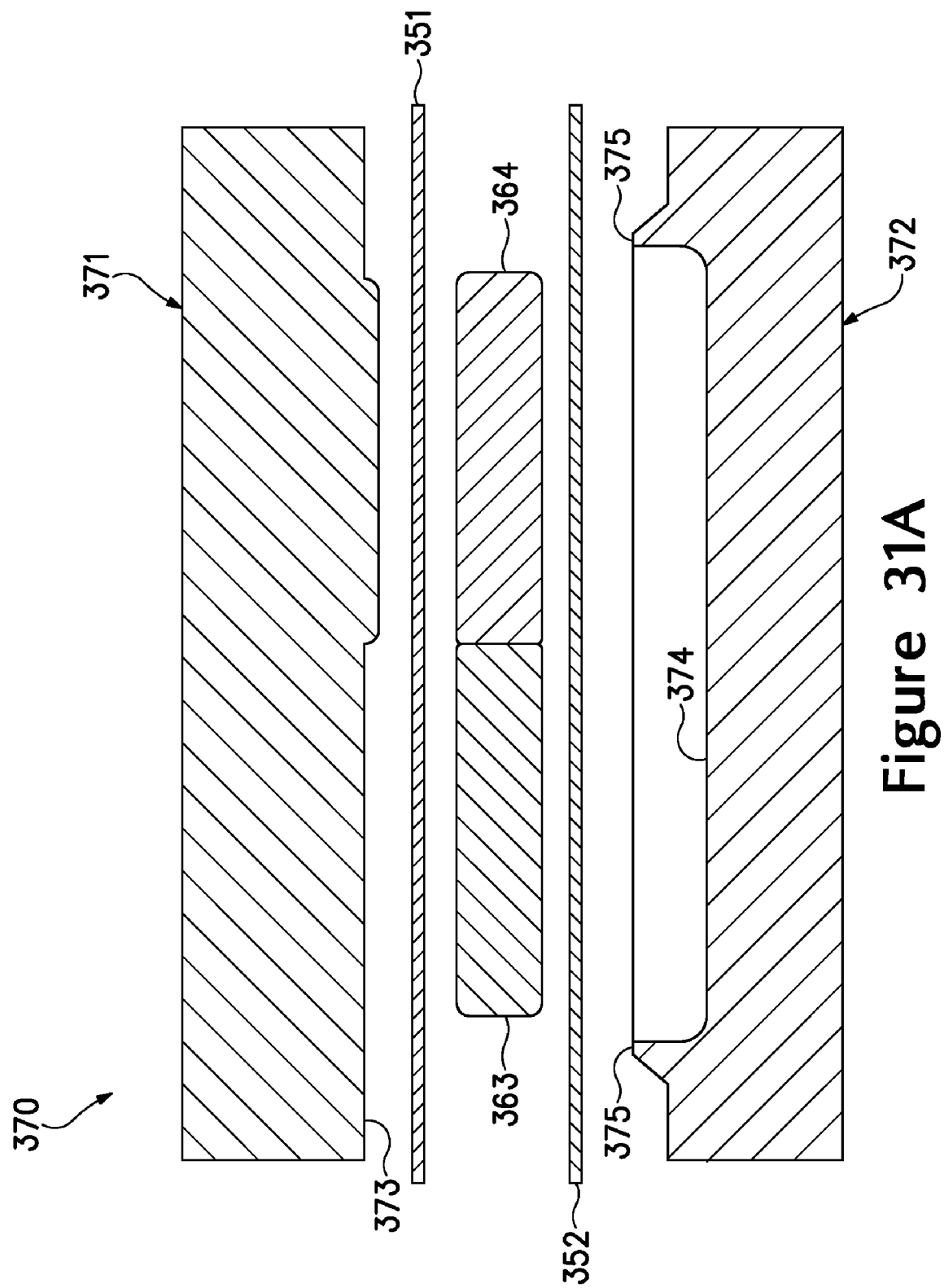
FIGS. 31A-31C are schematic cross-sectional views of a mold depicting steps in a manufacturing process for the fourth chamber.
Figure 31B:
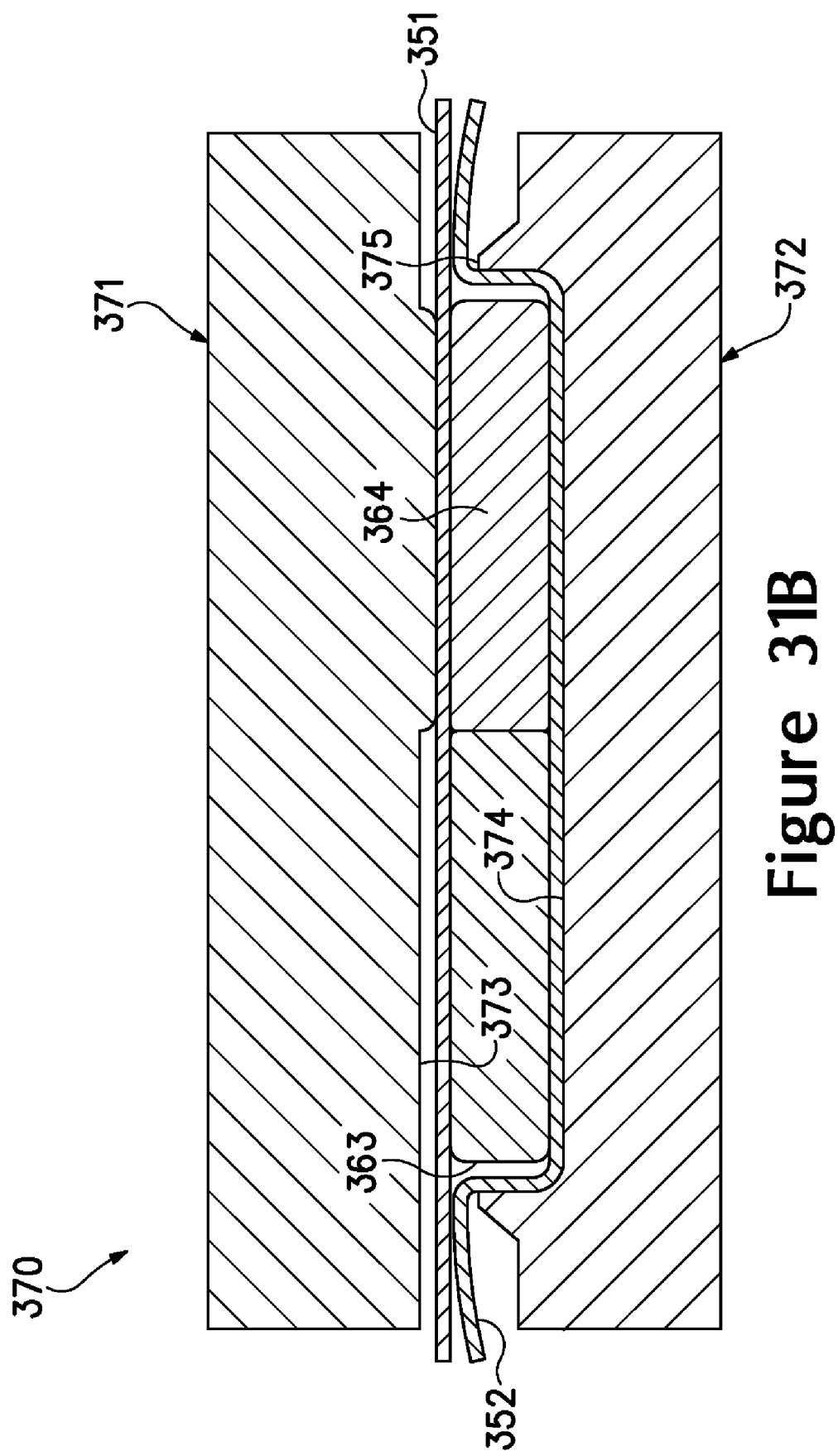
Figure 31C:
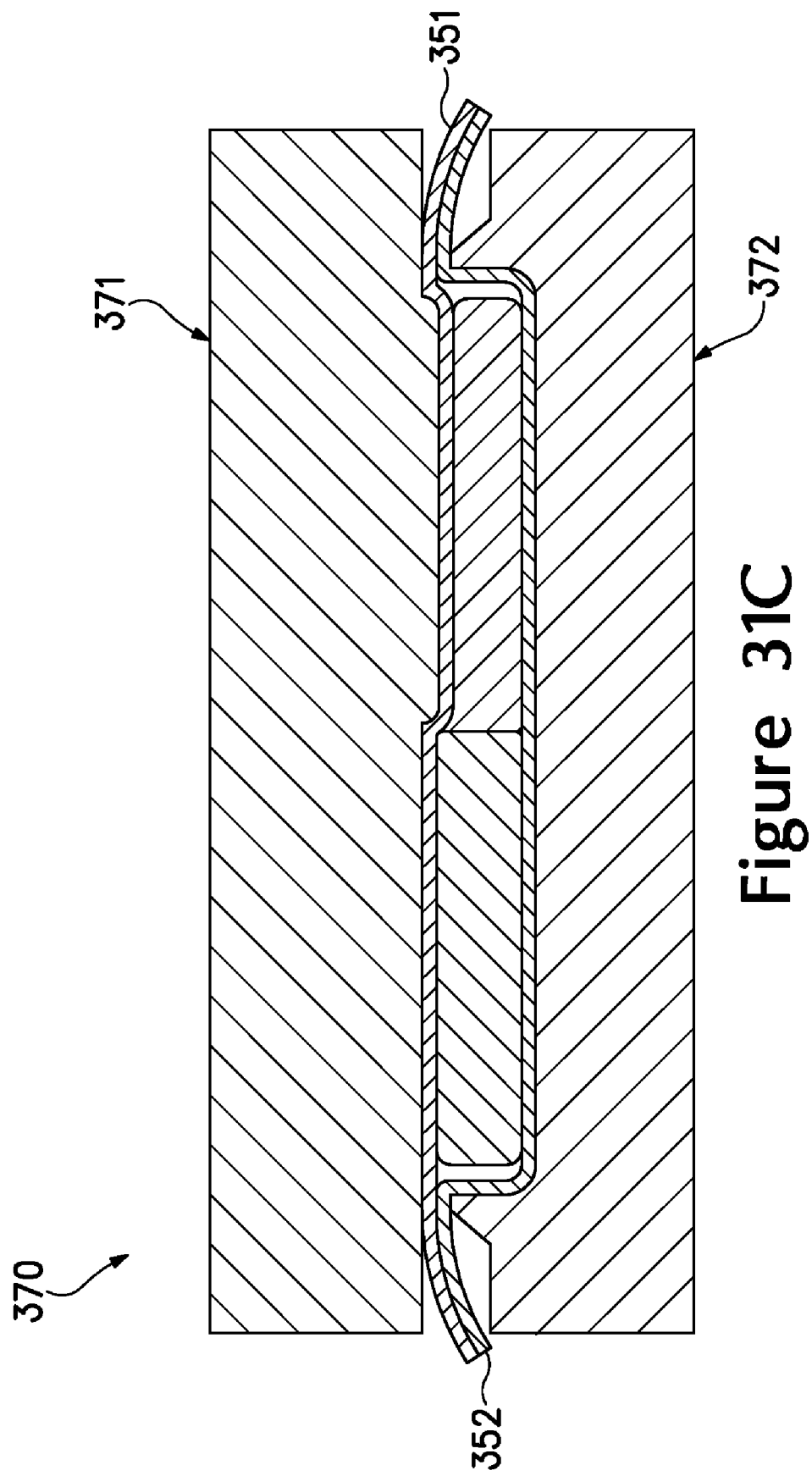

With reference to FIG. 31A, tensile member 360 and each of barrier layers 351 and 352 are located within a mold 370. More particularly, the components are located between a first mold portion 371 and a second mold portion 372 of mold 70. When mold portions 371 and 372 translate toward each other, a surface 373 and a surface 374 contact each of barrier layers 351 and 352, as depicted in FIG. 31B. Surface 373 includes a protruding area located adjacent foam material 364 so that the first portion of tensile member 360 that is compressed between barrier layers 351 and 352 is foam material 364. That is, mold 370 initially compresses the area corresponding with the less dense foam material 364. As mold portions 371 and 372 continue to translate toward each other, as depicted in FIG. 31C, all of tensile member 360 is compressed between barrier layers 351 and 352.

By forming a protruding area in surface 373, the area that corresponds with foam material 364 is compressed prior to other areas of tensile member 360, as depicted in FIG. 31B. As tensile member 360 is compressed further, as in FIG. 31C, the protruding area is compressed further to substantially equalize the compressive forces across tensile member 360. That is, the protruding area effectively increases the degree to which tensile member 360 and barrier layers 351 and 352 are compressed in areas corresponding with foam material 364. Accordingly, by initially compressing foam material 364 with the protruding area of mold 370, a uniform bond may be formed between tensile member 360 and barrier layers 351 and 352, thereby forming the bond to have substantially constant strength.

Further Tensile Member Configurations

The configurations of the various chambers 40, 140, and 240 discussed above were at least partially dependent upon the configurations of tensile members 60, 160, and 260. For example, planar surfaces generally resulted in chambers with planar surfaces, and contoured surfaces generally resulted in chambers with contoured surfaces. Additionally, the configurations of the various molds 70 and 270 utilized to form chambers 40, 140, and 240 were at least partially dependent upon the configurations of tensile members 60, 160, and 260. Accordingly, varying the configuration of a tensile member may be utilized to affect the properties of the resulting chamber as well as the manner in which the resulting chamber is formed.

Figure 32A:
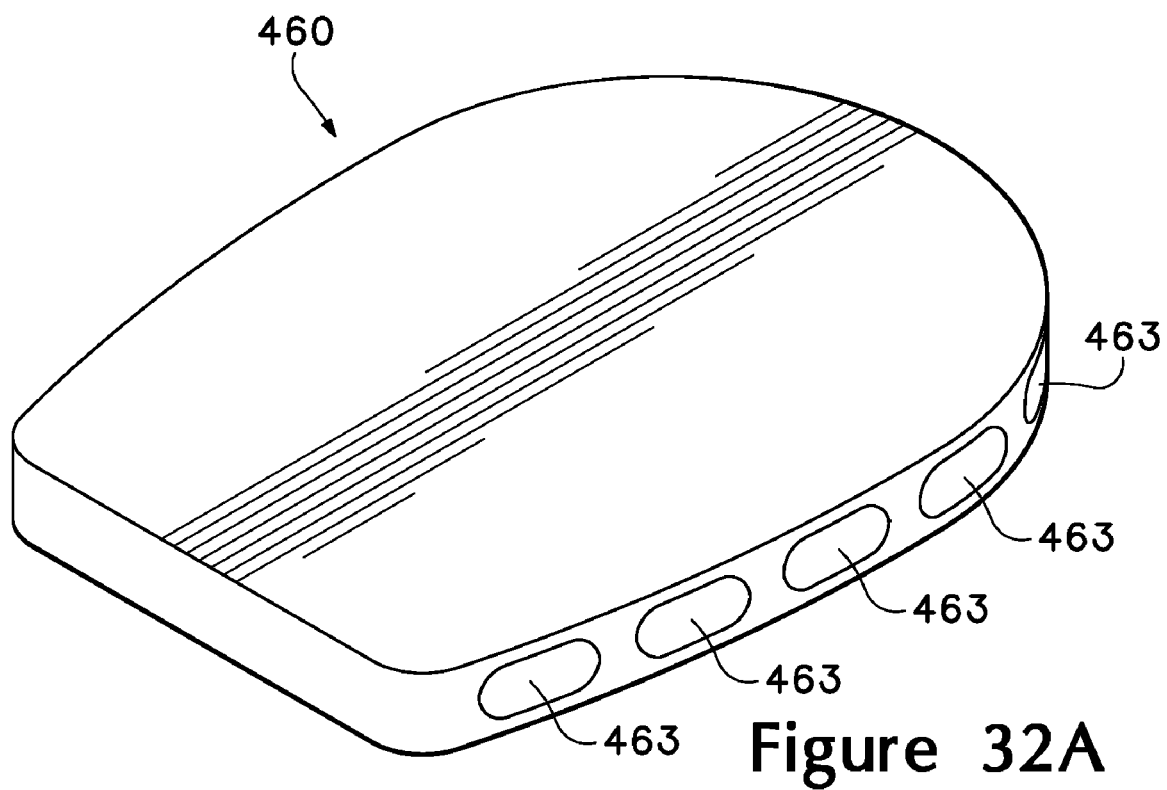
FIGS. 32A-32E are perspective views of various tensile members.
Figure 32B:
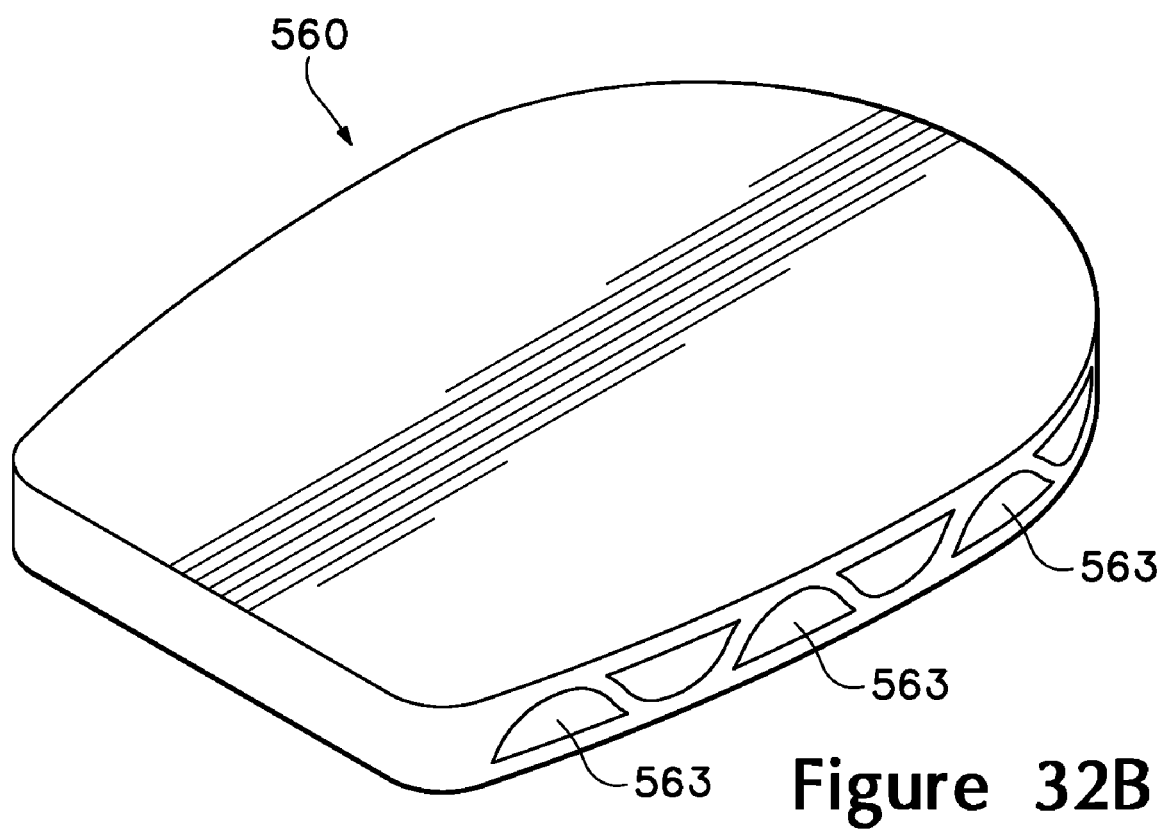
Figure 32C:
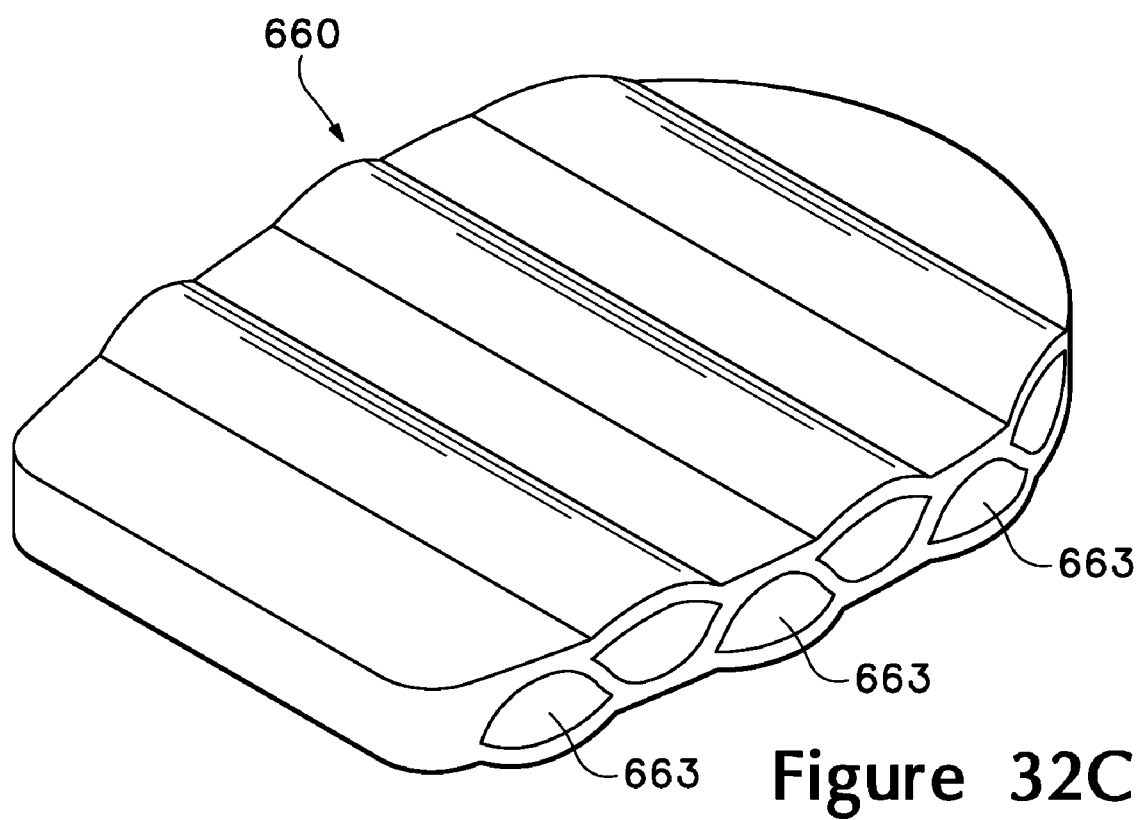
Figure 32D:
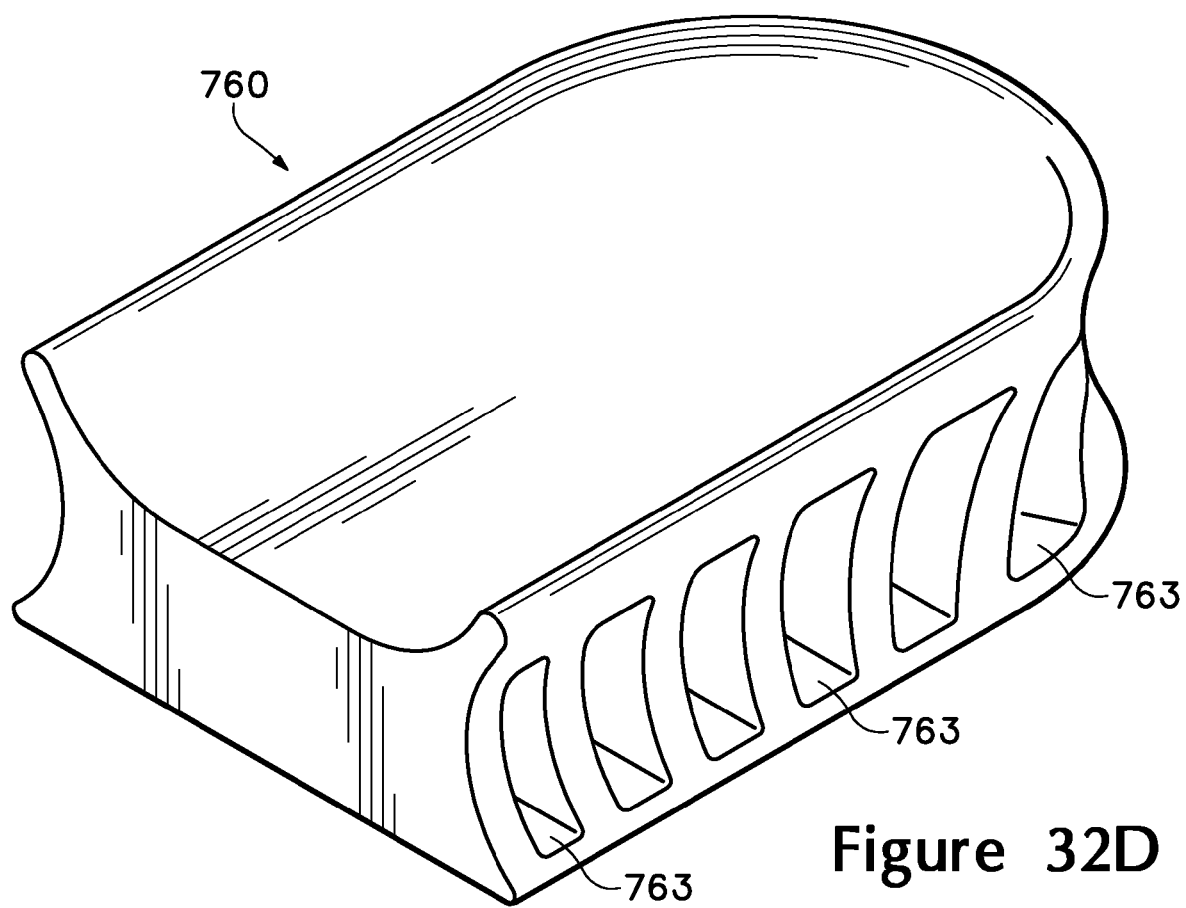
Figure 32E:
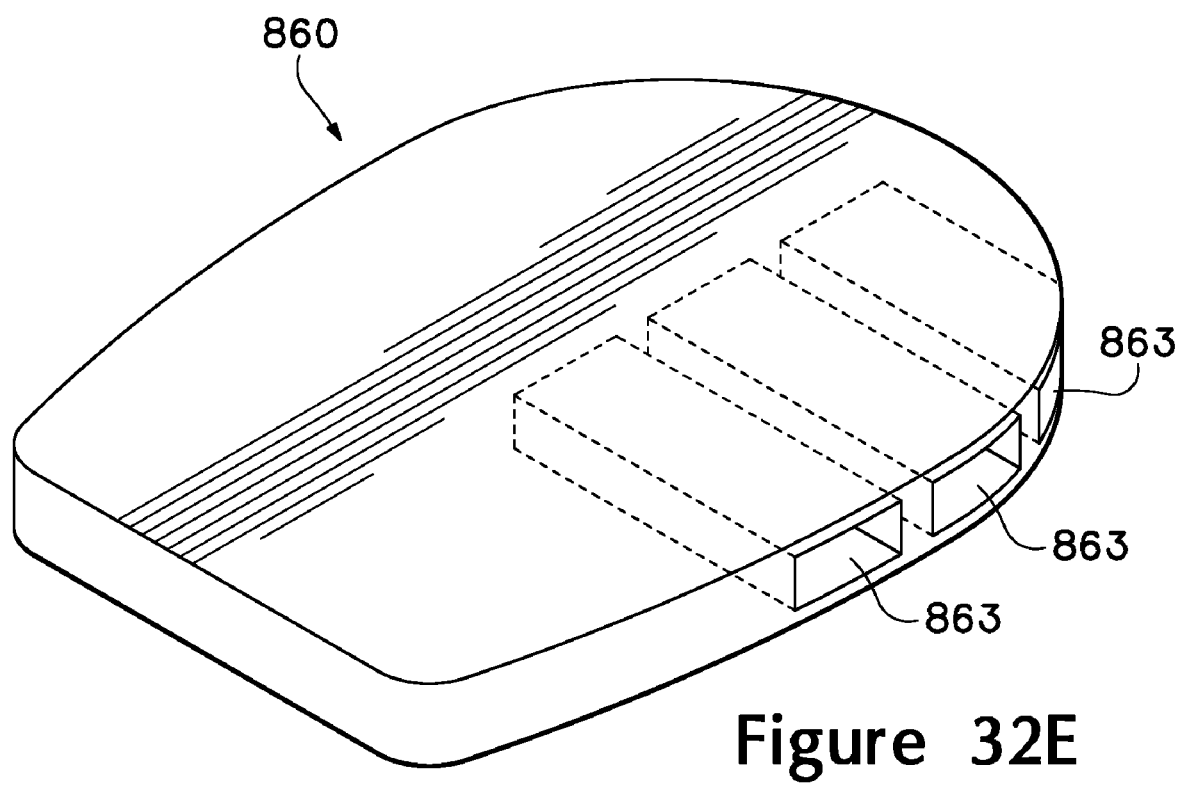

A tensile member 460 is depicted in FIG. 32A. In contrast with tensile member 60, which has generally rectangular cavities, tensile member 460 defines a plurality of oval cavities 463. A tensile member 560 is depicted in FIG. 32B as including a plurality of partial-circular cavities. Whereas upper and lower surfaces of tensile member 560 are substantially planar, a similar tensile member 660 is depicted in FIG. 32C as having contoured areas that correspond with the positions of various cavities 663. Whereas protrusions in a mold may be utilized to ensure that bonding is uniform for tensile members 460 and 560, the contours of tensile member 660 may operate in a manner that is similar to the contours of chamber 140. That is, the contours may permit use of a molding process without protrusions in a mold. Another tensile member 760 is depicted in FIG. 32D as having various cavities 763. Although tensile member 760 has a shape that is similar to a shape of tensile member 260, cavities 763 are generally rectangular and extend primarily between sides of tensile member 760. A further tensile member 860 is depicted in FIG. 32E as having three cavities 863 that extend only partially through a width of tensile member 860, rather than through the entire width. Accordingly, a variety of tensile member configurations may be utilized, and the specific molding process and mold configuration that is selected to bond polymer layers to the tensile members may depend at least partially upon the tensile member configuration being utilized to form a fluid-filled chamber.

CONCLUSION

As discussed in detail above, foam tensile members may exhibit areas of different compressibility. That is, the degree to which areas of a tensile member deflect when subjected to a compressive force may vary. Differences in compressibility may arise due to cavities or voids within the tensile members, or differences in compressibility may arise due to differences in foam density in various portions of the tensile members. In some instances, forming a mold to include protrusions or other contours may be utilized to provide uniform bonding throughout the tensile member. In other instances, contours of the tensile member may be utilized to provide uniform bonding throughout the tensile member. Additional details concerning foam tensile members and thermoforming methods are included in U.S. patent application Ser. No. 11/027,303, which was filed in the U.S. Patent and Trademark Office on Dec. 30, 2004 and entitled Method Of Thermoforming A Fluid-Filled Bladder, which is entirely incorporated herein by reference.

The invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A method of manufacturing a fluid-filled chamber, the method comprising:

placing a tensile member between a first layer and a second layer of polymer material, the tensile member having a first portion with greater compressibility than a second portion;

locating the tensile member, the first layer, and the second layer within a mold, the mold having a protrusion in an area that contacts the first layer adjacent to the first portion of the tensile member; and compressing the tensile member, the first layer, and the second layer within the mold to apply pressure with the protrusion to the first layer and the first portion of the tensile member and to also bond (a) the first layer to a first surface of the tensile member, (b) the second layer to a second surface of the tensile member, and (c) the first layer and the second layer together around a periphery of the tensile member.

2. The method recited in claim 1, further including a step of forming the tensile member to include at least one cavity in the first portion of the tensile member.

3. The method recited in claim 1, further including a step of forming the tensile member to include channels extending through the tensile member, at least one of the channels being in the first portion of the tensile member.

4. The method recited in claim 1, further including a step of forming the tensile member to include a first foam material and a second foam material, the first foam material being located in the first portion of the tensile member, the second foam material being located in the second portion of the tensile member, and the first foam material having less density than the second foam material.

5. The method recited in claim 1, further including steps of:
forming the tensile member from a thermoplastic polymer foam material; and
selecting the polymer material of the first layer and the second layer to be a thermoplastic polymer material.

6. The method recited in claim 5, wherein the step of compressing includes forming direct bonds between the tensile member and each of the first layer and the second layer.

7. The method recited in claim 1, further including steps of:
forming the first surface and the second surface of the tensile member to have substantially planar configurations; and
orienting the first surface and the second surface of the tensile member to be substantially parallel.

8. The method recited in claim 1, further including a step of forming at least one of the first surface and the second surface of the tensile member to have a contoured configuration.

9. The method recited in claim 1, wherein the step of placing and the step of locating are performed simultaneously.

10. The method recited in claim 1, further including a step of incorporating the chamber into an article of footwear.

11. A method of manufacturing a fluid-filled chamber, the method comprising:
locating a thermoplastic polymer foam tensile member within a mold and between a first layer and a second layer of thermoplastic polymer material, a first surface of the tensile member being located adjacent to the first layer, and a second surface of the tensile member being located adjacent to the second layer, the tensile member defining a cavity located between the first surface and the second surface, and the mold having a protrusion positioned to contact the first layer adjacent to the cavity;
compressing the tensile member, the first layer, and the second layer within the mold to apply pressure with the protrusion to the first layer and an area of the tensile member having the cavity and to also directly bond (a) the first layer to the first surface of the tensile member, (b) the second layer to the second surface of the tensile member, and (c) the first layer and the second layer together around a periphery of the tensile member; and
incorporating the chamber into an article of footwear.

12. The method recited in claim 11, further including a step of configuring the cavity to be a channel that extends through the tensile member.

13. The method recited in claim 11, further including steps of:
forming the first surface and the second surface of the tensile member to have substantially planar configurations; and
orienting the first surface and the second surface of the tensile member to be substantially parallel.

14. The method recited in claim 11, further including a step of forming at least one of the first surface and the second surface of the tensile member to have a contoured configuration.

15. The method recited in claim 11, further including a step of heating at least one of the tensile member, the first layer, and the second layer.

16. A method of manufacturing a fluid-filled chamber, the method comprising:
locating a tensile member within a mold and between a first layer and a second layer of polymer material, the tensile member having a first portion with greater compressibility than a second portion, and the mold defining a void for forming the chamber, a surface of the void having at least one protrusion; and
compressing the tensile member, the first layer, and the second layer within the mold, the protrusion contacting the first layer in an area that is adjacent to the first portion of the tensile member, and the protrusion compressing the first layer and the first portion of the tensile member together.

17. The method recited in claim 16, further including a step of forming the tensile member to include at least one cavity in the first portion of the tensile member.

18. The method recited in claim 16, further including a step of forming the tensile member to include channels extending through the tensile member, at least one of the channels being in the first portion of the tensile member.

19. The method recited in claim 16, further including a step of forming the tensile member to include a first foam material and a second foam material, the first foam material being located in the first portion of the tensile member, the second foam material being located in the second portion of the tensile member, and the first foam material having less density than the second foam material.

20. The method recited in claim 16, further including steps of:
forming the tensile member from a thermoplastic polymer foam material;
selecting the polymer material of the first layer and the second layer to be a thermoplastic polymer material; and
forming direct bonds between the tensile member and each of the first layer and the second layer.

21. The method recited in claim 16, further including a step of incorporating the chamber into an article of footwear.

22. A method of manufacturing a fluid-filled chamber, the method comprising:
placing a thermoplastic polymer foam tensile member between a first layer and a second layer of thermoplastic polymer material, the tensile member having:
a first surface located adjacent to the first layer, a second surface located adjacent to the second layer, and a plurality of cavities located between the first surface and the second surface; and compressing the tensile member, the first layer, and the second layer with a mold such that:

the mold contacts the first layer to directly bond the first layer to the first surface of the tensile member, the mold having a plurality of protrusions that contact the first layer adjacent to the cavities of the tensile member, the protrusions compressing the first layer and portions of the tensile member that are adjacent to the cavities together, the mold contacts the second layer to directly bond the second layer to the second surface of the tensile member, and the first layer and the second layer are compressed together around a periphery of the tensile member to form a direct bond between the first layer and the second layer.

23. The method recited in claim 22, further including a step of forming the cavities to be channels extending at least partially through the tensile member.

24. The method recited in claim 22, further including a step of forming the cavities to be channels extending between sides of the tensile member.

25. The method recited in claim 22, further including a step of forming the cavities to be channels extending entirely through the tensile member.

26. The method recited in claim 22, further including steps of:

forming the first surface and the second surface of the tensile member to have substantially planar configurations; and orienting the first surface and the second surface of the tensile member to be substantially parallel.

27. The method recited in claim 22, further including a step of forming at least one of the first surface and the second surface of the tensile member to have a contoured configuration.

28. The method recited in claim 22, further including a step of heating at least one of the tensile member, the first layer, and the second layer.

29. The method recited in claim 22, further including a step of incorporating the chamber into an article of footwear.

* * * * *